United States Patent
Li et al.

(10) Patent No.: US 11,119,232 B2
(45) Date of Patent: Sep. 14, 2021

(54) SYSTEM AND METHOD FOR REAL-TIME PASSIVE SEISMIC EVENT LOCALIZATION

(71) Applicant: THE GOVERNORS OF THE UNIVERSITY OF ALBERTA, Edmonton (CA)

(72) Inventors: Zhenhua Li, Edmonton (CA); Mirko Van Der Baan, Edmonton (CA)

(73) Assignee: THE GOVERNORS OF THE UNIVERSITY OF ALBERTA, Edmonton (CA)

( * ) Notice: Subject to any disclaimer, the term of this patent is extended or adjusted under 35 U.S.C. 154(b) by 11 days.

(21) Appl. No.: 16/683,719

(22) Filed: Nov. 14, 2019

(65) Prior Publication Data
US 2020/0158899 A1   May 21, 2020

(30) Foreign Application Priority Data
Nov. 15, 2018  (CA) ................. CA 3024240

(51) Int. Cl.
*G01V 1/28* (2006.01)
*G06F 17/16* (2006.01)

(52) U.S. Cl.
CPC ............. *G01V 1/288* (2013.01); *G01V 1/282* (2013.01); *G06F 17/16* (2013.01);
(Continued)

(58) Field of Classification Search
CPC .................. G01V 1/282; G01V 1/288; G01V 2210/6222; G01V 2210/675; G01V 2210/679; G06F 17/16
See application file for complete search history.

(56) References Cited

U.S. PATENT DOCUMENTS

| 7,663,970 B2 | 2/2010 | Duncan et al. |
| 7,978,563 B2 | 7/2011 | Thornton et al. |

(Continued)

OTHER PUBLICATIONS

Luo, Z. et al., "A Reduced-Order Extrapolation Spectral-Finite Difference Scheme Based on the POD Method for 2D Second-Order Hyberbolic Equations", Mathematical Modelling and Analysis, vol. 22, issue 5, Sep. 21, 2017.

(Continued)

*Primary Examiner* — Elias Desta
(74) *Attorney, Agent, or Firm* — Norton Rose Fulbright Canada LLP

(57) ABSTRACT

A computer-implemented method for seismic event localization includes: generating, with at least one processor, a vectorized snapshot matrix representing wave propagation data at a series of snapshots in time for a subterranean formation; computing a reduced orthonormal column basis matrix based on the vectorized snapshot matrix; constructing a reduced order wave propagation model based on the reduced orthonormal column basis matrix; receiving seismic data collected from a plurality of receivers at the subterranean formation; generating a time-domain coefficient matrix based on back propagation of the received seismic data and the reduced order wave propagation model; reconstructing time-reversed wavefield data based on the time-domain coefficient vector; and generating signals for outputting wavefield or seismic event location information based on the time-reversed wavefield data.

21 Claims, 21 Drawing Sheets

(52) U.S. Cl.
CPC ............... *G01V 2210/6222* (2013.01); *G01V 2210/675* (2013.01); *G01V 2210/679* (2013.01)

(56) References Cited

U.S. PATENT DOCUMENTS

| | | | |
|---|---|---|---|
| 8,612,155 B2* | 12/2013 | Khadhraoui | G01V 1/40 702/16 |
| 8,902,710 B2 | 12/2014 | Williams-Stroud et al. | |
| 10,545,250 B2* | 1/2020 | Abel | G01V 1/40 |
| 2015/0331122 A1* | 11/2015 | Prange | G01V 1/42 702/14 |

OTHER PUBLICATIONS

Lu, Z. et al., "Mulitcrack Localization in Rotors Based on Proper Orthogonal Decomposition Using Fractal Dimension and Gapped Smoothing Method", Shock and Vibration, vol. 2016, Publication date: May 2016.

* cited by examiner

Core Structure

- Offline training:
  - Simulate the wave propagation behavior with designated sources and medium properties (full model, Very large, easily over billion grid points in 3D medium)
  - Apply a machine learning technique to the traditional wave equation based simulations
  - Generate a compact discrete model (reduced order model) having all the wavefield features (Very small, can be less than a thousand grid points, over a million times smaller)
  - Need to train a new model if medium properties or source locations change

FIG. 12

Core Structure

- Online source imaging:
  - Calculate the reduced order model instead of the full model repeatedly
  - Wavelet used in online computing can be different from the one used in offline training
  - Reconstruct wavefield at the source location

FIG. 13

SYSTEM AND METHOD FOR REAL-TIME PASSIVE SEISMIC EVENT LOCALIZATION

CROSS-REFERENCE TO RELATED APPLICATION

This application claims all benefit including priority to Canadian Patent Application No. 3,024,240, filed Nov. 15, 2018, and entitled, "SYSTEM AND METHOD FOR REAL-TIME PASSIVE SEISMIC EVENT LOCALIZATION", the entirety of which is hereby incorporated by reference.

FIELD

Embodiments of the present disclosure relate generally to the field of seismology, and some embodiments particularly relate to systems and methods for seismic event localization.

BACKGROUND

Event localization is an important task for seismic monitoring, including locating earthquakes in global seismology (Fehler, 2008) and microseismicity in hydraulic fracturing treatment (van der Baan et al, 2013, Li and Van der Baan, 2016). Time-reversal extrapolation is a promising event localization technique using full waveform information (McMechan et al, 1985, Artman et al, 2010), which can also be called backward wavefield extrapolation. In traditional time-reversal extrapolation, receivers are treated as sources and the three-component wavefields are time-reversed and directly propagated toward its source location using a two-way elastic wave modeling operator and a known velocity model (McMechan, 1983). This method could be more accurate compared to traditional travel-time based methods since no picking of P- and S-wave first arrivals is required.

Location results may be badly affected by mispicking and inaccurate (Castellanos and Van der Baan, 2015, Li and Van der Baan, 2016). Li and Van der Baan (2016) introduce an improved time-reversal extrapolation scheme, in which both particle velocity and pressure are extrapolated separately followed by their combination according to the acoustic representation theorem.

SUMMARY

For the purpose of computational efficiency, the same type of data can be extrapolated simultaneously. However, the above-noted methods are still both impractical for application in continuous real-time monitoring because solving a very large simulation system composed of several spatially discretized elastic wave equations is computationally intensive.

Traditional time-reversal extrapolation is a promising technique for passive seismic event localization. However, the technique is based on solving discrete two-way wave equations using the finite difference or finite element method, which makes it very time-consuming and not suitable for real-time applications. The generated wavefields have information redundancy that only a small amount of information is enough to represent the whole extrapolation process.

In some embodiments, proper orthogonal decomposition is used to remove information redundancy and create a much smaller extrapolation system, with which real-time or near real-time passive seismic event localization is possible. Aspects of the present disclosure describe a extrapolation system which applies proper orthogonal decomposition to the first-order two-way elastic wave equations. In some embodiments, the extrapolation system is used to build a continuous waveform based passive seismic event localization scheme that can, in some instances, rapidly locate multiple seismic events and determine their origin time.

In accordance with an aspect of the present disclosure, there is provided a computer-implemented method for seismic event localization. The method includes: generating, with at least one processor, a vectorized snapshot matrix representing wave propagation data at a series of snapshots in time for a subterranean formation; computing a reduced orthonormal column basis matrix based on the vectorized snapshot matrix; constructing a reduced order wave propagation model based on the reduced orthonormal column basis matrix; receiving seismic data collected from a plurality of receivers at the subterranean formation; generating a time-domain coefficient matrix based on back propagation of the received seismic data and the reduced order wave propagation model; reconstructing time-reversed wavefield data based on the time-domain coefficient vector; and generating signals for outputting wavefield or seismic event location information based on the time-reversed wavefield data.

In accordance with another aspect, there is provided a computing system for seismic event localization. The system includes: at least one memory and at least one processor. The at least one processor is configured for: generating a vectorized snapshot matrix representing wave propagation data at a series of snapshots in time for a subterranean formation; computing a reduced orthonormal column basis matrix based on the vectorized snapshot matrix; constructing a reduced order wave propagation model based on the reduced orthonormal column basis matrix; receiving seismic data collected from a plurality of receivers at the subterranean formation; generating a time-domain coefficient matrix based on back propagation of the received seismic data and the reduced order wave propagation model; reconstructing time-reversed wavefield data based on the time-domain coefficient vector; and generating signals for outputting wavefield or seismic event location information based on the time-reversed wavefield data.

In accordance with another aspect, there is provided a non-transitory computer-readable medium or media having stored thereon computer-readable instructions which when executed by at least one processor, configure the at least one processor to perform at least some aspects of any of the methods described herein.

DESCRIPTION OF THE FIGURES

Reference will now be made to the drawings, which show, by way of example, embodiments of the present disclosure.

FIG. 12 outlines aspects of an example first or offline training stage.

FIG. 13 outlines aspects of an example second or online source imaging stage.

DESCRIPTION OF EXAMPLE EMBODIMENTS

Figure 2:
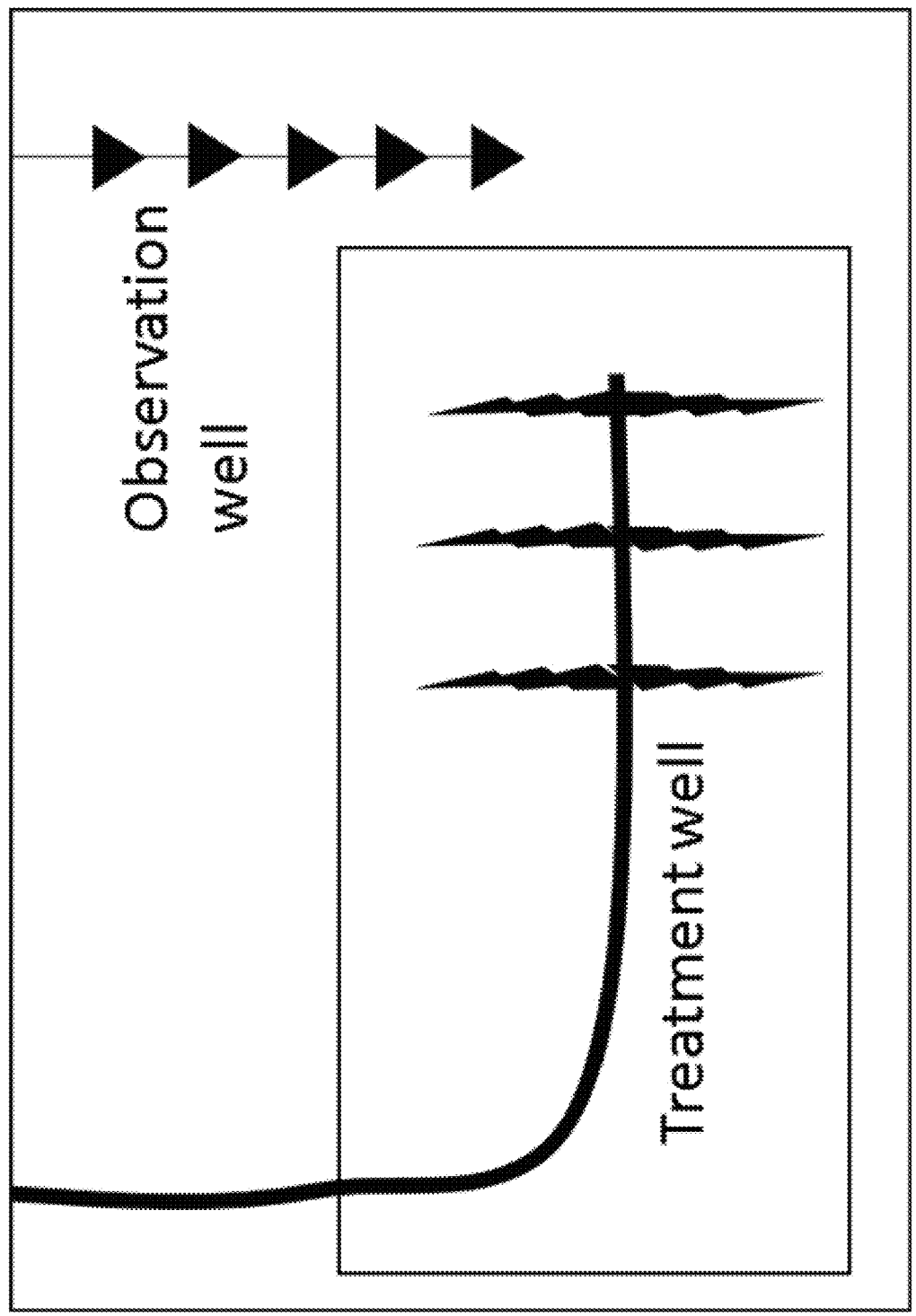
FIG. 2 shows aspects of an example subterranean formation, wells and example training and target areas.

FIG. 2 shows a cross-section of an example subterranean formation to which aspects of the present disclosure may be applied. In the example formation, is a treatment well and an observation well. Three hydraulic fracturing stages are at the end of the treatment well. The triangles represent receivers in a borehole. As described herein or otherwise, in some embodiments, the area surrounded by the outer box can represent a model used for training, which the inner box can represent a smaller target area in which wavefields can be reconstructed.

Figure 11:
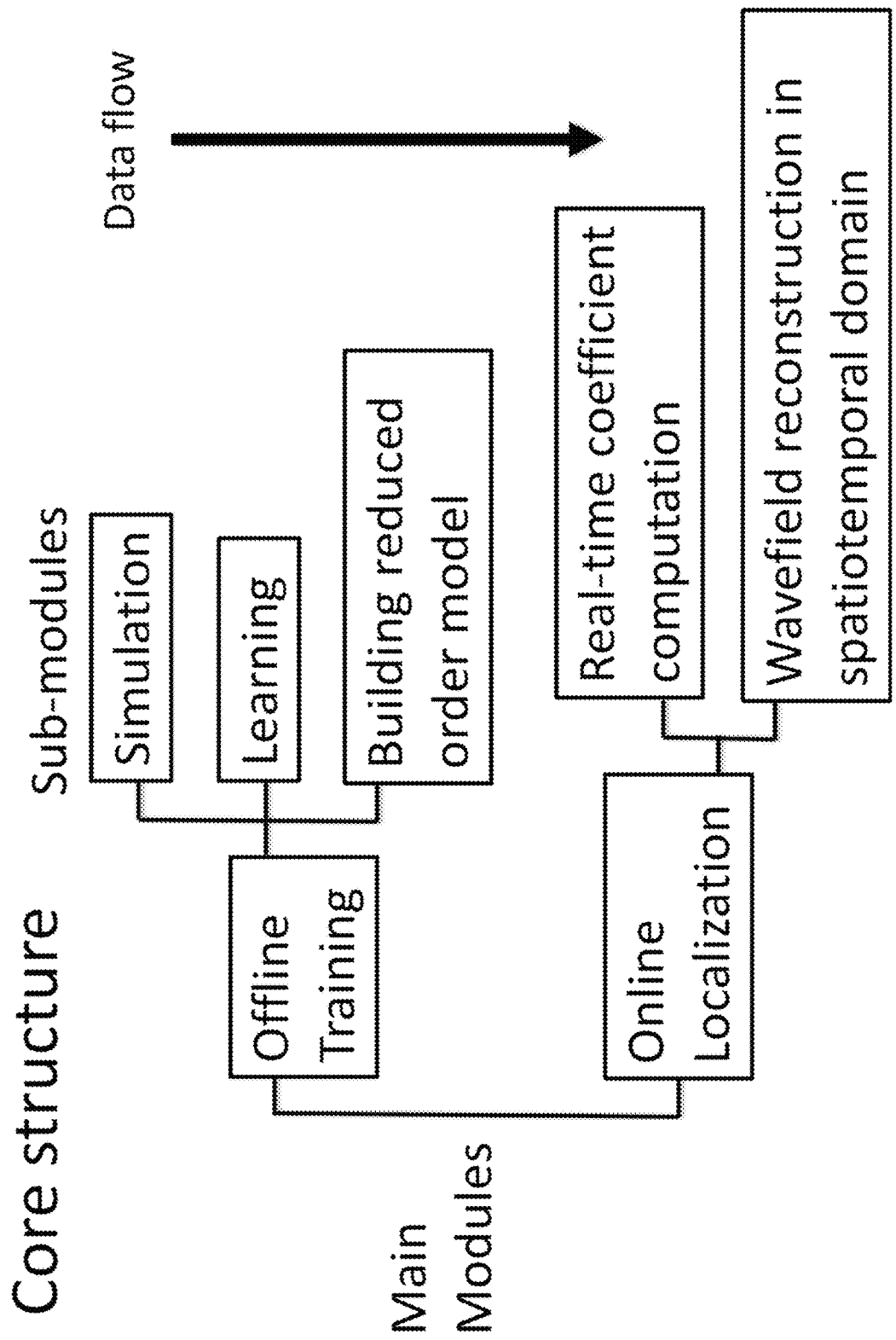
FIG. 11 is a diagram showing aspects of an example system and process for seismic event localization.
Figure 14:
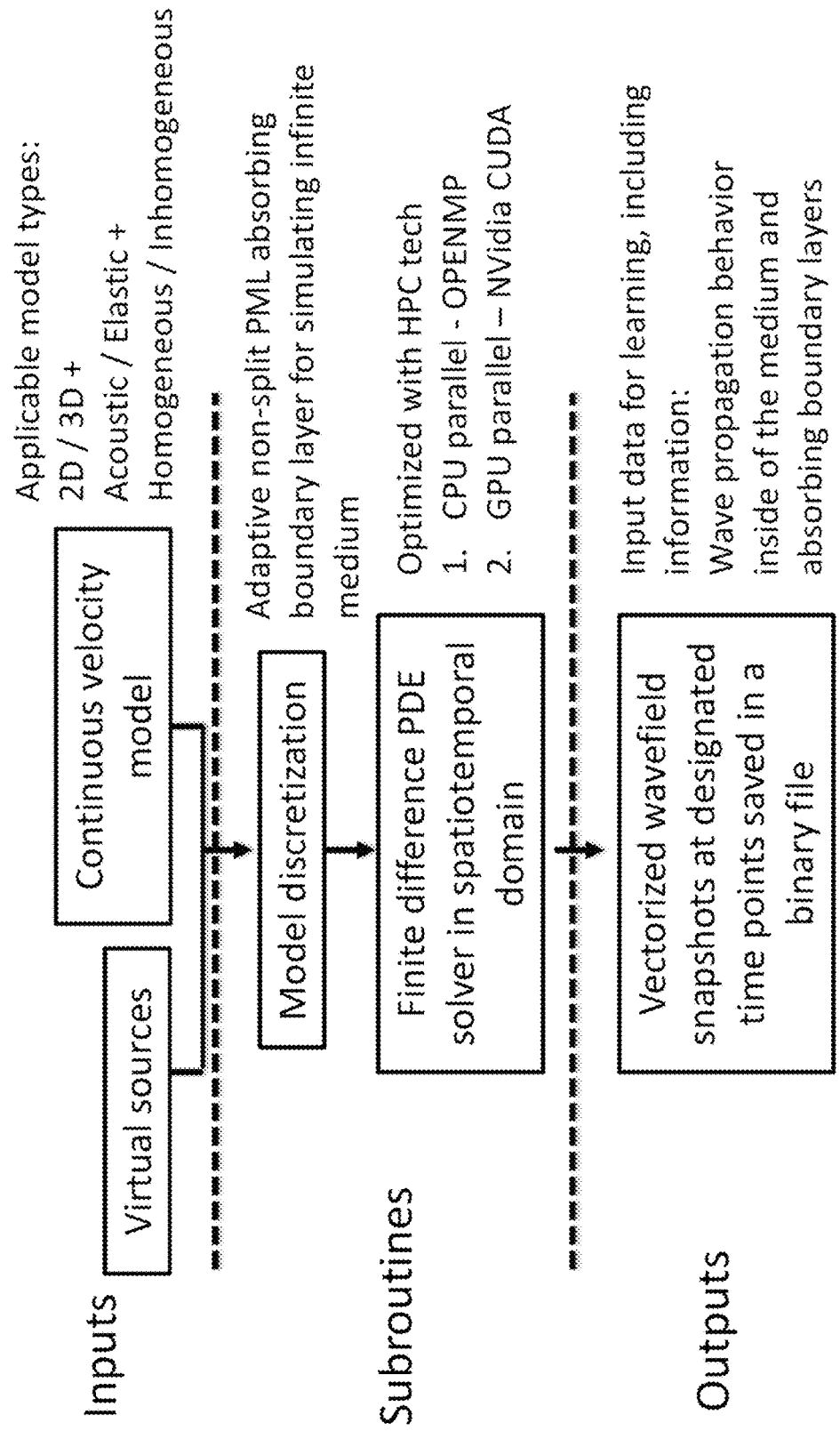
FIG. 14 outlines aspects of an example simulation phase of an example first or offline training stage.

FIG. 11 shows a dataflow diagram showing multiple modules or processing stages, and the general direction of the flow of data. In some embodiments, the modules can be software code, hardware, or a combination thereof which include or configure one or more processing devices to perform one or more aspects of the processes illustrated in FIG. 11 or described herein or otherwise.

In some embodiments, a system or device can include one or more processors, one or more memories and/or data storage devices, one or more communication interfaces, one or more input and/or output devices (e.g. displays), and/or one or more receivers at a subterranean formation (e.g. within or at the surface of a subterranean formation).

In some embodiments, the processor(s) are configured to perform one or more of the aspects of the methods and processes described herein.

In some embodiments, the processor(s) are configured to perform a method for seismic event localization. In some embodiments, as illustrated in FIG. 11, the method can include a first or offline training stage, and a second or online stage.

As described herein or otherwise, in some embodiments, the first stage can include simulation process(es), machine learning or training process(es), and process(es) for building a reduced order model.

As described herein or otherwise, in some embodiments, the second stage can include process(es) for real-time coefficient computation, and wavefield reconstruction in a spatiotemporal domain.

Figure 18:
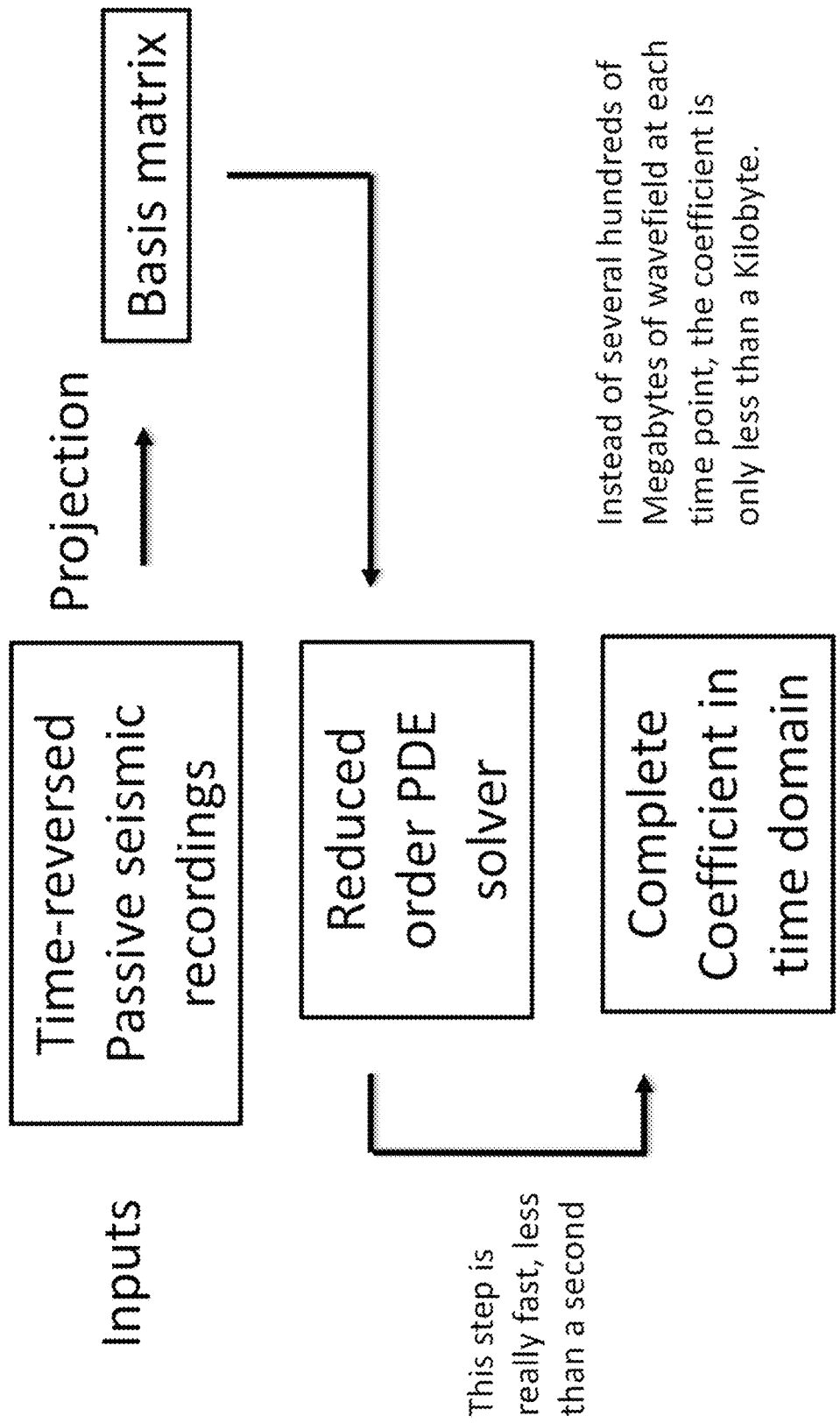
FIG. 18 outlines aspects of an example coefficient calculation phase of an example second or online localization stage.
Figure 19:
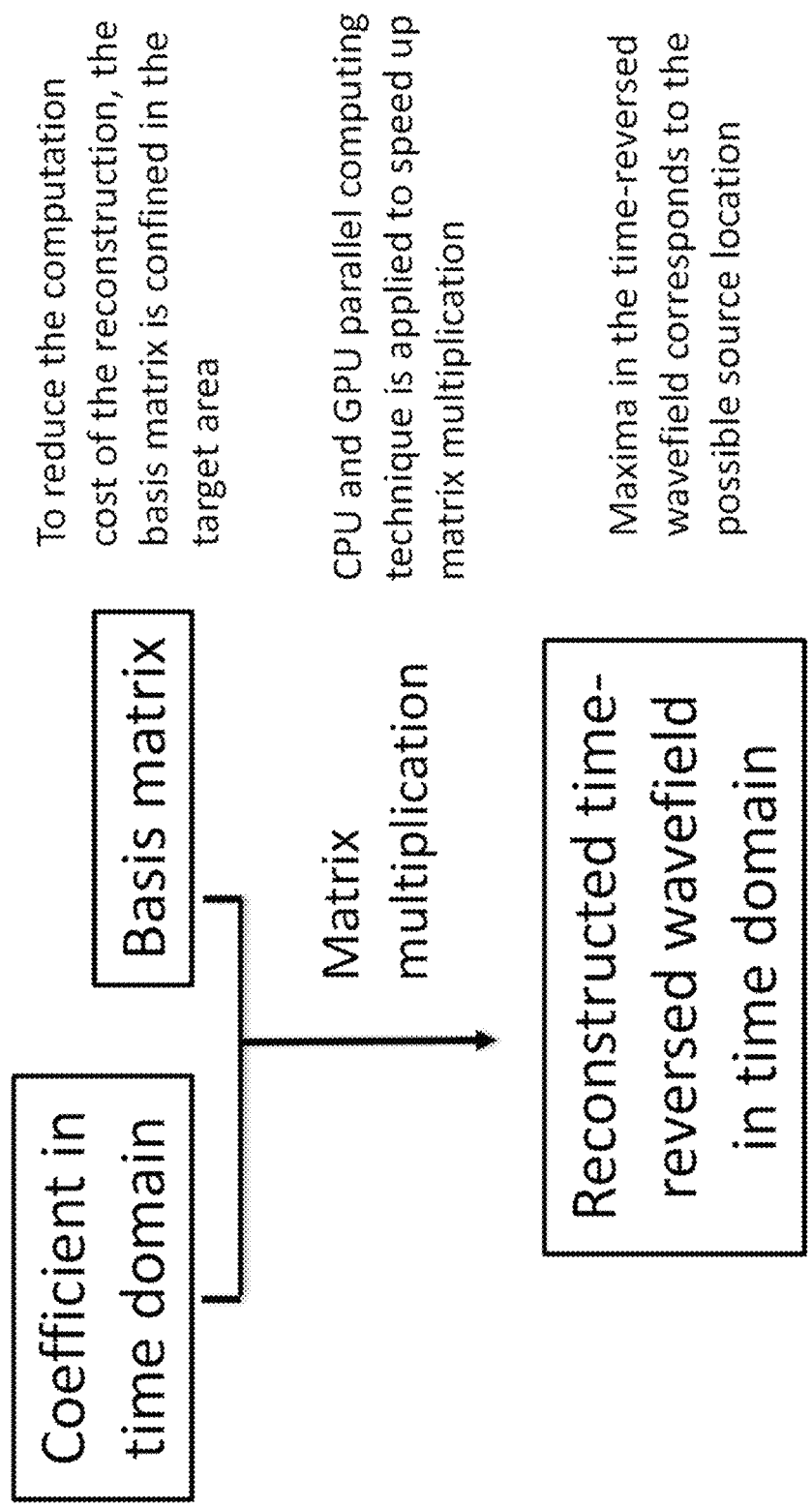
FIG. 19 outlines aspects of an example location determination phase of an example second or online localization stage.
Figure 20:
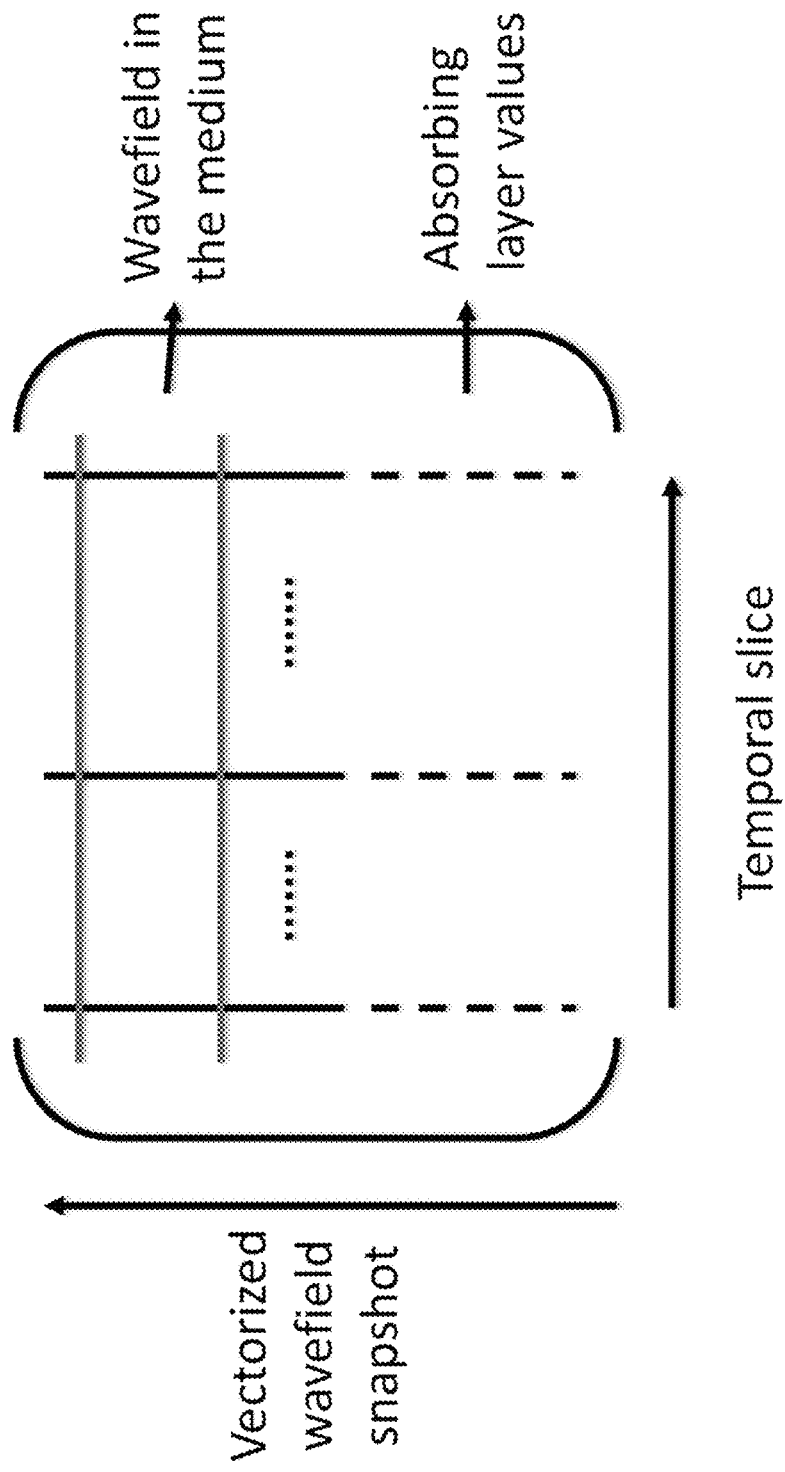
FIG. 20 shows an example data structure of an example location determination phase.

Aspects of an example offline or first stage are outlined in FIGS. 12, 14, 16 and 17. Aspects of an example online or second stage are outlined in FIGS. 13, 18, and 19.

Figure 21:
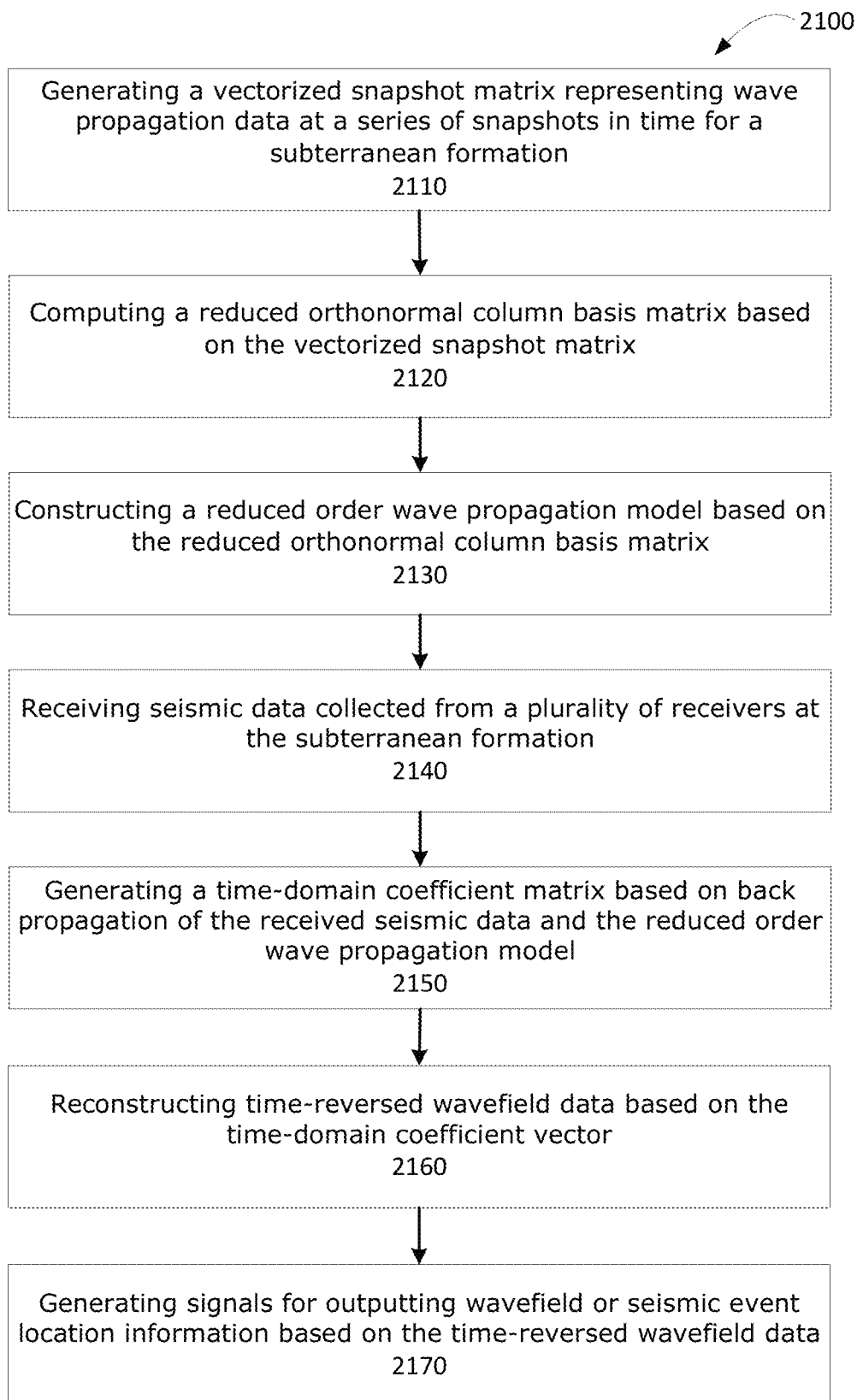
FIG. 21 shows aspects of an example method for seismic event localization.

As described herein or otherwise, FIG. 21 shows aspects of an example method for seismic event location. At 2110, one or more processor(s) generate a vectorized snapshot matrix representing wave propagation data at a series of snapshots in time for a subterranean formation. In some embodiments, generating the vectorized snapshot matrix includes simulating wave propagations on a set of spatially discretized partial differential equations; and extracting simulated wave propagation data at each snapshot in the series of snapshots in time.

In some embodiments, simulating the wave propagations uses source positions corresponding to locations of physical receivers at the subterranean formation. In some embodiments, locations at the subterranean formation can include locations within the subterranean location (e.g. locations in wells), locations around the subterranean formation (e.g. at surface level), or any other location at which receivers may be positioned to receive relevany seismic or other data.

In some embodiments, the set of spatially discretized partial differential equations include 2-dimensional stress-velocity two-way elastic wave equations as described herein or otherwise.

In some embodiments, the wave propagation data is generated with a velocity model associated with the subterranean formation. In some embodiments, this is based on previously collected data or otherwise known, assumed, predicted or calculated parameters or characteristics of the subterranean formation.

Figure 15:
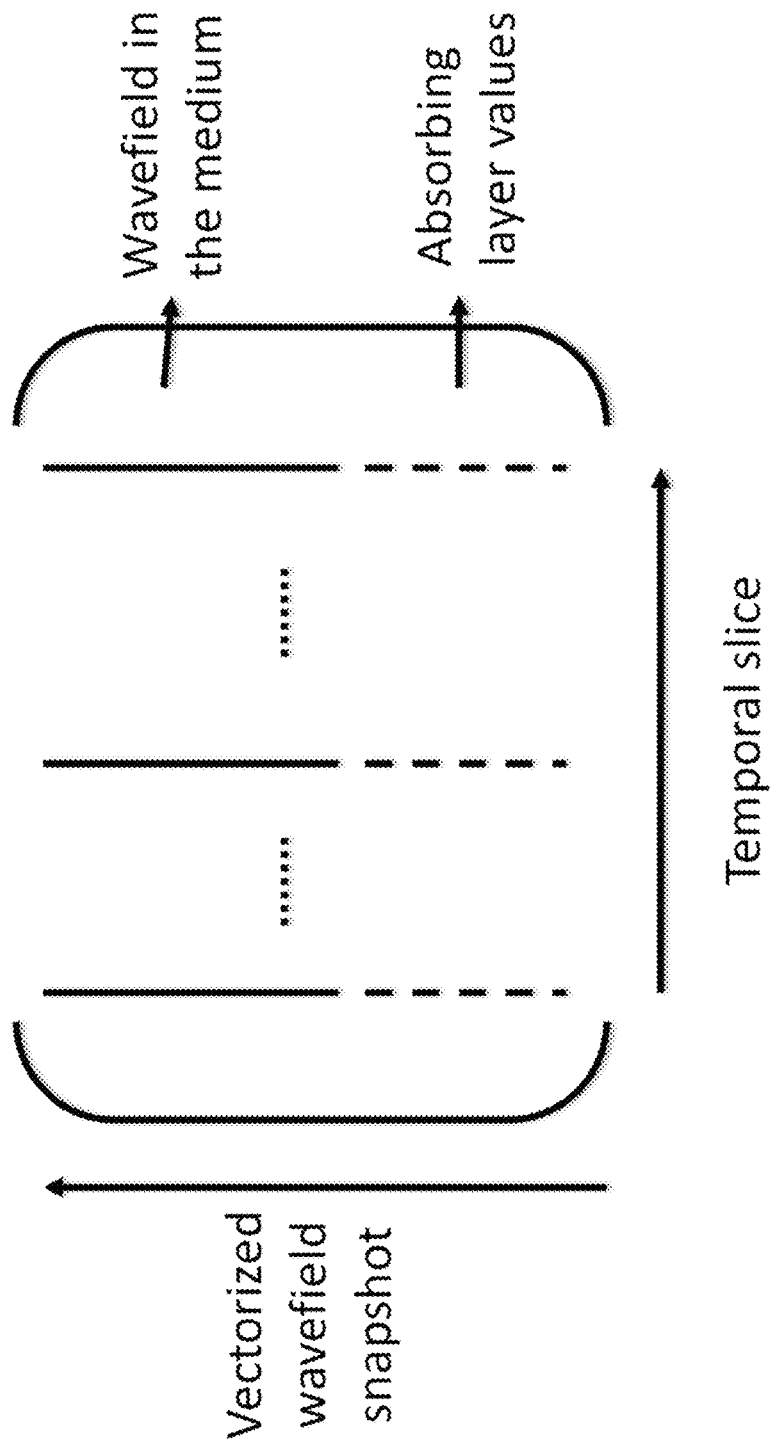
FIG. 15 shows an example data structure of an example simulation phase.
Figure 16:
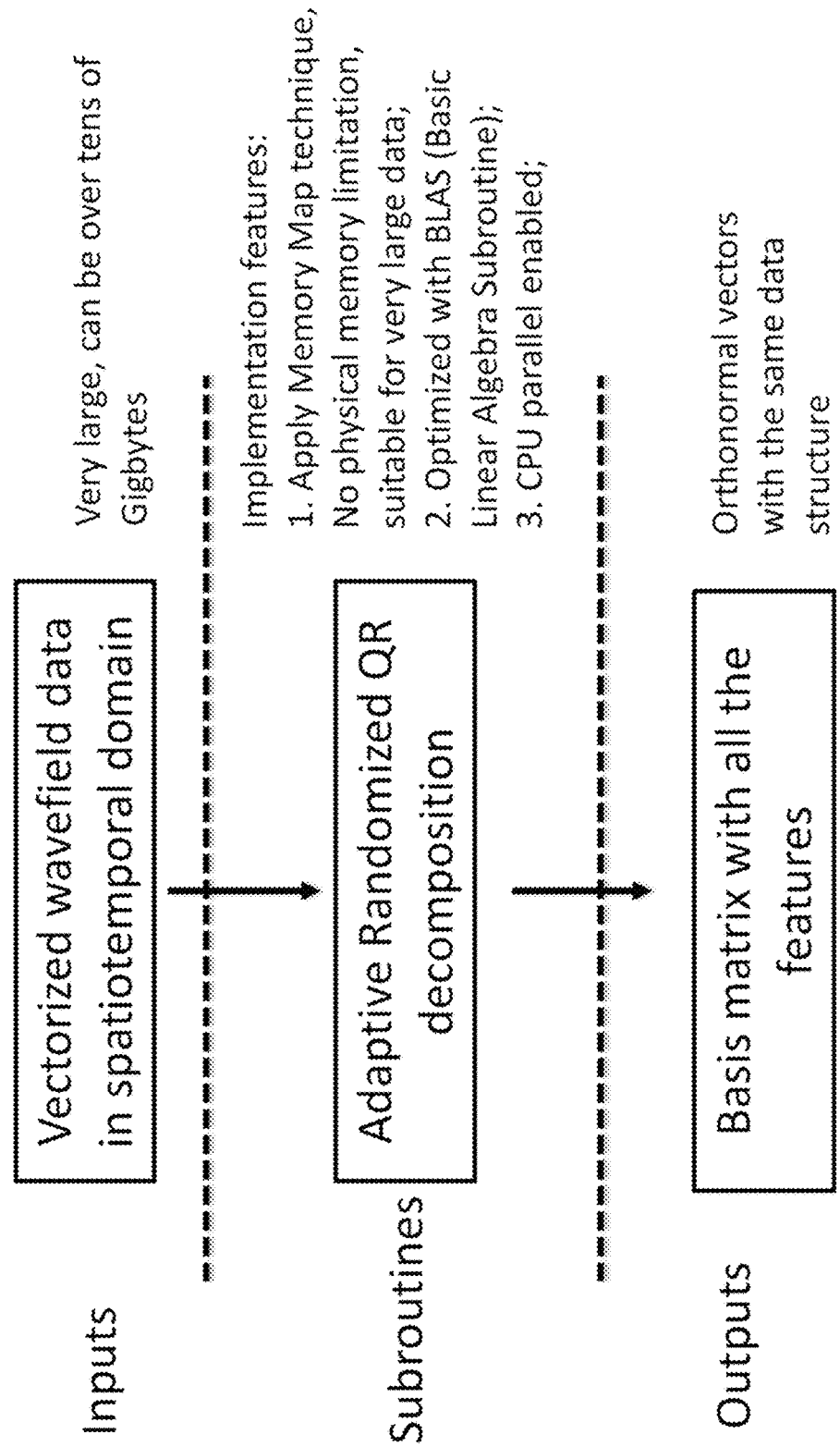
FIG. 16 outlines aspects of an example learning phase of an example first or offline training stage.
Figure 17:
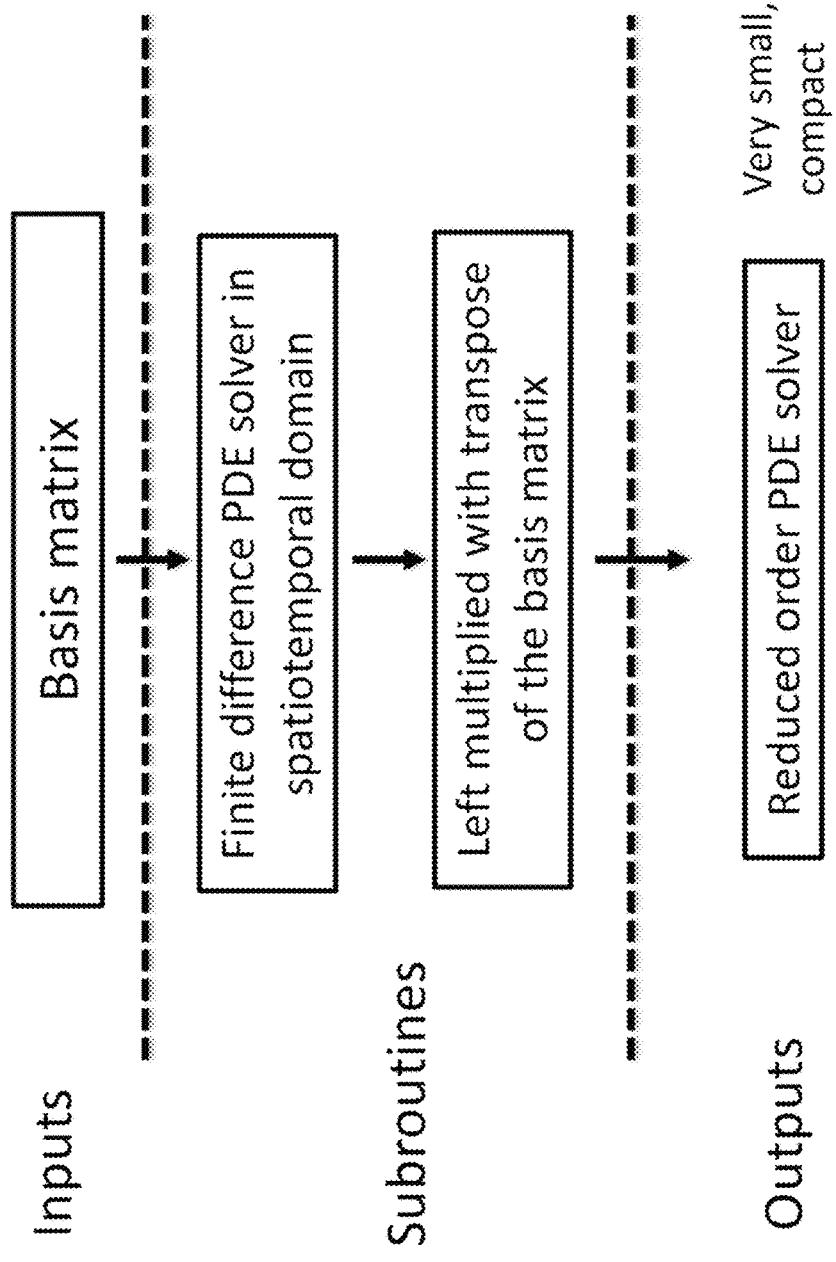
FIG. 17 outlines aspects of an example reduced order model building phase of an example first or offline training stage.

In some embodiments, the vectorized snapshot matrix can be generated to include wave propagation data and absorbing layer values as illustrated for example in FIG. 15.

At 2120, as described herein or otherwise, the processor(s) compute a reduced orthonormal column basis matrix based on the vectorized snapshot matrix. In some embodiments, computing the reduced orthonormal column basis matrix includes performing a singular value decomposition and/or QR decomposition.

In some embodiments, computing the reduced orthonormal column basis matrix is based on multi-dimensional stress-velocity two-way elastic wave equations as described herein or otherwise.

At 2130, as described herein or otherwise, the processor(s) construct a reduced order wave propagation model based on the reduced orthonormal column basis matrix. In some embodiments, the reduced order wave propagation model can include one or more data structures including data representing values or parameters for defining the model.

At 2140, as described herein or otherwise, the processor(s) receive seismic data collected from a plurality of receivers at the subterranean formation. As noted above, receivers at the subterranean formation can include receivers positioned within, above or otherwise around the formation.

In some embodiments, seismic data can include pressure data, particle velocity data and/or any other data which can be used for seismic event localization.

At 2150, as described herein or otherwise, the processor(s) generate a time-domain coefficient matrix based on back propagation of the received seismic data and the reduced order wave propagation model.

At 2160, as described herein or otherwise, the processor(s) reconstruct time-reversed wavefield data based on the time-domain coefficient vector.

In some embodiments, reconstructing the time-reversed wavefield data is based on reconstructing a target area of the subterranean formation. As illustrated by the target area in FIG. 2, in some instances, the target area is a subset of or is otherwise smaller than the subterranean formation. In some embodiments, reconstructing only the target area can be faster than reconstructing the wavefield data across the entire formation. In some embodiments, the target area is a volume of the subterranean formation.

At 2170, as described herein or otherwise, the processor(s) generate signals for outputting wavefield or seismic event location information based on the time-reversed wavefield data. In some embodiments, outputting the wavefield or seismic event location information can include storing the information, generating visual representations (for display on a screen or printout), generating visual or audible alerts, sending communications to recipients or other systems/devices, and the like.

In some embodiments, the processors are configured to use proper orthogonal decomposition (POD). In some embodiments, this can be based on Pereyra and Kaelin (2008) which proposes a fast acoustic wavefield propagation simulation procedure by constructing an order-reduced modeling operator, which provides a possible solution to the issue of high computational cost mentioned above. In some instances, this may speed up simulation by projecting the spatially discretized wave equations from a higher dimensional system to a much lower dimensional system, still keeping sufficient accuracy (Pereyra and Kaelin, 2008).

POD is a technique aimed at reducing the complexity of a numerical simulation system using mathematical insights. In some embodiments, POD can be applied in many dynamic system simulations as shown in (Chatterjee, 2000) and (Schilders, 2008). Applications include modeling of fluid flow, real-time control, heat conduction (Lucia et al., 2004), wavefield propagation (Pereyra and Kaelin, 2008, Wu et al., 2013), aircraft design (Lieu et al, 2006), arterial simulations (Lassila et al, 2013) and nuclear reactor core design (Sartori et al, 2014), etc. POD is based on the observation that simulations with a high computational load often repeatedly solve the same problem (Benner et al, 2015).

In the case of time-reversal extrapolation for microseismic event localization, the continuously recorded data are back-propagated through an unchanging velocity model. Thus the wave propagation 'engine' does not change, only the recorded data vary. Also, informational redundancy exists in most of the traditional simulation processes (Schilders, 2008), which means the discretized wave equations can be represented as a large but sparse matrix which can be compressed into a small but denser system that is much faster to solve.

In accordance with one aspect, the present disclosure describes an adaptive randomized QR decomposition (ARQRd) based POD method. In some instances, this method may balance accuracy and computational efficiency.

The basic idea is to project the original data in a high-dimensional space to a low-dimensional data space using randomly selected vectors. However, the dimension of the new space is usually unknown (Halko et al., 2010) and sometimes needs to be pre-tested before the new matrix can capture the demanded amount of features in the original data. In the present disclosure, ARQRd may automatically provide the new projected data which not only have the minimum dimension but also capture the most amount of information without the need for pretesting.

In some embodiments, a reduced-order two-way elastic wave modeling system is built that can be used for time-reversal extrapolation using the proposed POD process. In some embodiments, a POD-based energy flux based focusing criterion can be used to fit in the low-order modeling scheme (Li and Van der Baan (2017)). The new wavefield extrapolation approach is more computationally efficient which makes real-time automatic seismic event localization possible. As illustrated herein, the ARQRd results have been compared with the results from traditional time-reversal extrapolation.

Similar techniques, such as randomized SVD and randomized QR, have been applied as rapid rank approximation methods for geophysical purposes (Gao et al., 2011, Oropeza and Sacchi, 2011, Cheng and Sacchi, 2015), especially when dealing with large datasets.

POD generally has two steps, namely an off-line training part where the smaller simulation system is learned and created, and an on-line calculation where the data are repeatedly generated with little cost and high accuracy.

1.1 Off-Line Training

In some embodiments, off-line training is an aspect of POD which includes the following steps:

(1) Compute training data and construct a snapshot matrix, which is formed from high-fidelity simulations. In some embodiments, a high-fidelity simulation is calculated by numerically solving a group of spatially discretized partial differential equations (PDEs), given by $$\frac{\partial u(t)}{\partial t} = Lu(t) + f(t), \quad (1)$$

where u is a time dependent state variable, which is spatially discrete but continuous in time; L is a matrix of partial differential operators, f is a time dependent source term, the total discretized simulation time is $N_T$. Equation 1 is a general form of discretized PDEs that is applicable in 1D, 2D or 3D wave simulations. Finite difference or finite element methods are the two most common methods to solve equation 1. Since equation 1 represents a time-varying system, a snapshot means one time slice of a high-fidelity simulation of the system. A series of snapshots extracted during the full simulation are put into snapshot matrix $A_{s_i}$ in chronological order, given by $$A_{s_i} = [u_1^i, u_2^i, u_3^i, \ldots, u_{N_t}^i], \quad (2)$$

where $s_i$ means the $i^{th}$ simulation; each column $u_t^i$ corresponds to a vectorized snapshot at time t and the subscript index $N_t$ is the total number of time slices used for training, where $N_t \leq N_T$ and the sampling time interval between any two adjacent slices has to satisfy the Nyquist sampling theorem. For multiple simulations, an even larger snapshot matrix A is constructed comprising multiple snapshot matrix, given by $$A = [A_{s_1}, A_{s_2}, A_{s_3}, \ldots, A_{s_n}], \quad (3)$$

where n is the number of simulations. Each simulation $s_i$ can represent different aspects, for instance, different source positions or different source radiation patterns.

(2) Compute and compress a left orthogonal basis of snapshot matrix A. The basic assumption of POD is that matrix A can be approximated by a new matrix Q whose rank is much lower than the size of either dimension of matrix A, while still keeping most of the key information of A, denoted by $$\text{Rank}(Q) \ll \text{Minimum}(m,n), \qquad (4)$$

where m and n are the row and column numbers of snapshot matrix A respectively. The selection of Q is non-unique. In some embodiments, Q is defined as an orthonormal basis such that each column of the matrix A can be expressed by a combination of columns in Q with sufficient accuracy. Since Q is an orthonormal matrix, it also satisfies the condition $$Q^T Q = I, \qquad (5)$$

where I is an identity matrix (Strang, 2006).

In some embodiments, singular value decomposition (SVD) or QR decomposition (QRd) can be used to compute the left orthonormal basis Q and the singular values of the snapshot matrix A. The approximated rank $R_A$ is determined by choosing the largest singular values and the corresponding columns are grouped into Q which is only a small portion of the full left orthonormal basis, as long as the selected basis Q is enough to span the column space of the snapshots matrix A, mathematically satisfying the evaluation criterion $$\|A - Q Q^T A\| \le \varepsilon \qquad (6)$$

where $\|\cdot\|$ denotes the $l_2$ norm and $\varepsilon$ is a positive error tolerance (Halko et al., 2010). The selected basis Q can be referred to as the reduced orthonormal column basis.

In some embodiments, ARQRd is used to calculate the left orthonormal basis Q. It can be seen as a randomized Gram-Schmidt method embedded with the evaluation criterion (equation 6), where the reduced orthonormal column basis Q of the snapshot matrix A is calculated in an iterative scheme (Halko et al., 2010).

In the $i^{th}$ iteration, a new column vector $c_i$ is first calculated through a projection of snapshot matrix A using $$c_i = A \omega_i, \qquad (7)$$

where $\omega_i$ is a random column vector with a Gaussian distribution. Then $c_i$ is orthonormalized to all previously generated i−1 columns using the Gram-Schmidt method before it is added to the desired basis Q. Equation 6 is evaluated in each iteration so that the calculated basis Q has a minimum number of columns satisfying the evaluation criterion with a given error tolerance $\varepsilon$, when iteration stops. This makes ARQRd more computationally efficient than traditional randomized QR or SVD (Halko et al., 2010).

(3) Construct a new reduced simulation system. In some embodiments, the new reduced system approximates the full system (1), as long as the source positions are unchanged. The source waveforms can be different but must have an overlapping frequency content. The state variable u(t) can then be expressed as a linear combination of the reduced orthonormal column basis Q, using $$u(t) = Q a(t), \qquad (8)$$

where a(t) is a coefficient vector at time t. Note equation 8 is the key assumption that makes this method successful. Equation 8 is substituted into equation 1 giving $$\frac{\partial Q a(t)}{\partial t} = L Q a(t) + f(t). \qquad (9)$$

Given that matrix Q is time independent, we can further rephrase the equation by multiplying its both sides with $Q^T$, rendering $$\frac{\partial a(t)}{\partial t} = Q^T L Q a(t) + Q^T f(t), \qquad (10)$$

where $Q^T L Q$ is a reduced-order partial differential operator matrix of size $[N_Q, N_Q]$; $Q^T f(t)$ a reduced-order source term. It can be seen from equation 4 that the dimensions of the new simulation system is much smaller than the original one (equation 1), which ensures the repeated simulations can be done on-the-fly.

1.2 On-Line Simulation

In some embodiments, Equation 10 is solved on-the-fly using a finite difference method, where both spatial and temporal axes are discretized, given by $$a_{i+1} - a_{i-1} = L a_i + Q^T f_i, \qquad (11)$$

where L is the reduced finite difference operator $Q^T L Q$ scaled by dt; $a_{i+1}$, $a_i$ and $a_{i-1}$ are coefficient vectors at discrete time point i+1, i and i−1; Q is the basis matrix scaled by dt.

At each time iteration, the coefficient vector a is updated using equation 11 and saved for wavefield construction. Then, any snapshot $u_i$ at time point i can be reconstructed using equation 8.

2 Reduced-Order Time-Reversal Extrapolation

Two dimensional (2D) stress-velocity two-way elastic wave equations are given by $$\frac{\partial v_x(t)}{\partial t} = \frac{1}{\rho} \frac{\partial \tau_{xx}(t)}{\partial x} + \frac{1}{\rho} \frac{\partial \tau_{xz}(t)}{\partial z} + f_{v_x}(t) \qquad (12)$$

$$\frac{\partial v_z(t)}{\partial t} = \frac{1}{\rho} \frac{\partial \tau_{xz}(t)}{\partial x} + \frac{1}{\rho} \frac{\partial \tau_{zz}(t)}{\partial z} + f_{v_z}(t)$$

$$\frac{\partial \tau_{xx}(t)}{\partial t} = (\lambda + 2\mu) \frac{\partial v_x(t)}{\partial x} + \lambda \frac{\partial v_z(t)}{\partial z} + f_p(t)$$

$$\frac{\partial \tau_{zz}(t)}{\partial t} = (\lambda + 2\mu) \frac{\partial v_z(t)}{\partial z} + \lambda \frac{\partial v_x(t)}{\partial x} + f_p(t)$$

$$\frac{\partial \tau_{xz}(t)}{\partial t} = \mu \left( \frac{\partial v_x(t)}{\partial z} + \frac{\partial v_z(t)}{\partial x} \right),$$

where $\tau_{xx}$ and $\tau_{zz}$ are the x and z components of the normal stress fields; $\tau_{xz}$ is shear stress field; $v_x$ and $v_z$ are horizontal and vertical components of particle velocity fields; $f_{v_x}$ and $f_{v_z}$ are single forces and $f_p$ is an external pressure source.

Equation 12 is written into the matrix form of equation 1 by assigning that $$u = \begin{pmatrix} v_x \\ v_z \\ \tau_{xx} \\ \tau_{zz} \\ \tau_{xz} \end{pmatrix}, \quad (13)$$

$$L = \begin{pmatrix} 0 & 0 & \frac{1}{\rho}L_x & 0 & \frac{1}{\rho}L_z \\ 0 & 0 & 0 & \frac{1}{\rho}L_z & \frac{1}{\rho}L_x \\ (\lambda+2\mu)L_x & \lambda L_z & 0 & 0 & 0 \\ \lambda L_x & (\lambda+2\mu)L_z & 0 & 0 & 0 \\ \mu L_z & \mu L_x & 0 & 0 & 0 \end{pmatrix},$$

$$f = \begin{pmatrix} f_{v_x} \\ f_{v_z} \\ f_P \\ f_P \\ 0 \end{pmatrix},$$

where $L_x$, $L_y$ and $L_z$ represent the matrix form of the spatial derivatives $$\frac{\partial}{\partial x}, \frac{\partial}{\partial y} \text{ and } \frac{\partial}{\partial z};$$

u and f are the vectorized wavefields and source term respectively.

Figure 1:
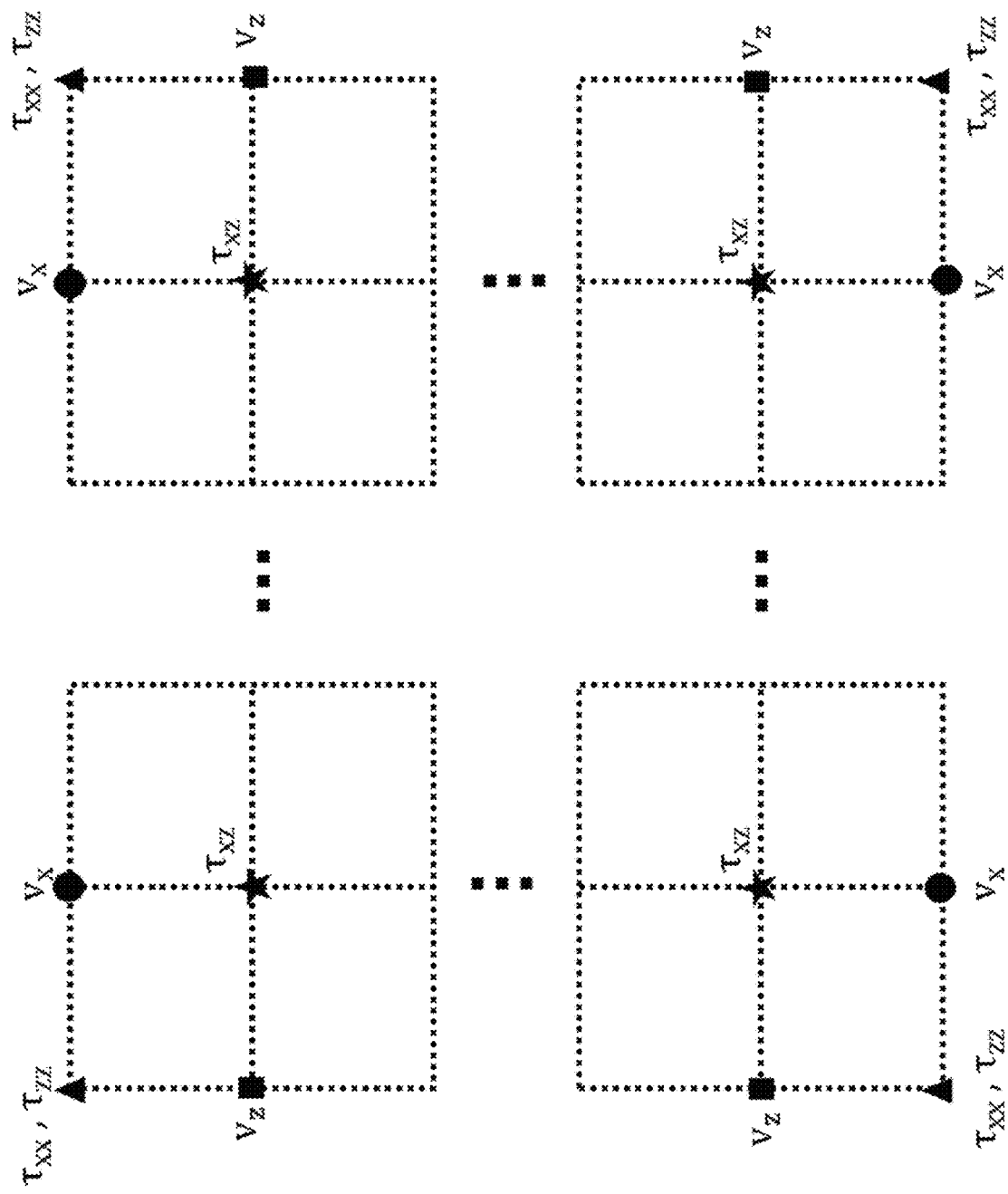
FIG. 1 shows relative locations of example wavefield components in a staggered grid.

In some embodiments, a staggered grid finite difference method is used to discretize the 2D model, where wavefield variables $v_x$, $v_z$, $\tau_{xx}$, $\tau_{zz}$ and $\tau_{xz}$ are assigned to the grid according to FIG. 1 (Zeng and Liu, 2001), with the corresponding grid size $[N_z, N_x-1]$, $[N_z-1, N_x]$, $[N_z, N_x]$, $[N_z, N_x]$ and $[N_z-1, N_x-1]$. Since u is a vector composed of five vectorized wavefield variables, its length is the sum of their total grid numbers, denoted by $N_m$. Likewise, L is a sparse matrix with the size of $[N_m, N_m]$.

Next, the processor(s) are configured to build a reduced-order system of two-way elastic wave equations for time reversal extrapolation. Though the derivation is in the 2D space for simplicity, it can be extended to the 3D space with no problem. Moreover, two assumptions are needed for this derivation, namely (1) receiver locations and approximated velocity model are known; (2) the same finite differential operator is used in both forward and time-reversal extrapolations.

The idea of traditional time-reversal extrapolation is basically the same as wave propagation simulation using equation 12. The only difference is that the source term $f_{v_x}$ and $f_{v_z}$ in equations 1 and 13 are replaced with the time-reversed x- and z-component of particle velocity recordings, which means in this method receivers are turned into sources from where recordings are injected into the medium (McMechan, 1983).

2.1 Offline Training

According to the previous description, the size of the snapshot matrix A is directly determined by the number of receivers. For generality, we assume there are $N_s$ receivers located at coordinates $[x_1,z_1]$, $[x_2,z_2]$, ..., $[x_{N_s},z_{N_s}]$ for passive seismic monitoring, where x and z are horizontal position and depth respectively. Since in 2D reverse-time extrapolation, there are horizontal and vertical components of recordings to be extrapolated, simulations from sources with a single component, horizontal and vertical, are both needed to generate both P- and S-wavefields, and all of these are included in one snapshot matrix A for training (Equation 3). The snapshot matrix for a $j^{th}$ horizontal single-force source $s_j$ located at $[x_j, z_j]$ is $$U_{s_j}^x = [u_1^x, u_2^x, \ldots u_{N_t}^x], \quad (14)$$

where superscript x refers to the horizontal direction of a single-force source; $N_t, N_T$, where $N_T$ is discrete total simulation time. A similar expression holds for $U^z$ where superscript z denotes vertical direction. Then the complete snapshot matrix for training is grouped as $$A = [U_{s_1}^x, U_{s_2}^x, \ldots U_{s_{N_s}}^x, U_{s_1}^z, U_{s_2}^z, \ldots U_{s_{N_s}}^z] \quad (15)$$

Then we apply ARQRd to the snapshot matrix A to get a basis Q with the grid size of $[N_m, N_Q]$ following the step (2) in the last section. Likewise, we construct a reduced-order partial differential operator $Q^T L Q$, which can be used in time-reversal extrapolation for real-time passive seismic localization. The size of the new partial differential operator is $[N_Q, N_Q]$. Since $N_Q \ll N_m$, the size of the reduced-order extrapolation system is much smaller than the original one.

Based on the previous derivation, the reduced-order time-reversal extrapolation system can be built by first replacing the source term f in equation 13 with the time-reversed horizontal and vertical components of particle velocity recordings $R_x^{tr}$ and $R_z^{tr}$ respectively, given by $$D^{tr} = \begin{pmatrix} R_x^{tr} \\ R_z^{tr} \\ 0 \\ 0 \\ 0 \end{pmatrix}, \quad (16)$$

where the total temporal sampling number of recordings is $N_D$. Equation 1 becomes $$\frac{\partial u^{tr}}{\partial t} = L u^{tr} + D^{tr}, \quad (17)$$

where $u^{tr}$ are the time-reversed wavefields, denoted by $$u^{tr} = \begin{pmatrix} v_x^{tr} \\ v_z^{tr} \\ \tau_{xx}^{tr} \\ \tau_{zz}^{tr} \\ \tau_{xz}^{tr} \end{pmatrix}, \quad (18)$$

Analogous to the derivation of equation 10, equation 17 is written into a reduced-order form $$\frac{\partial a^{tr}(t)}{\partial t} = Q^T L Q a^{tr}(t) + Q^T D^{tr}, \quad (19)$$

where $a^{tr}(t)$ is the coefficient vector at time t for time-reversal extrapolation; $Q^T D^{tr}$ are the reduced-order recordings as a source term. Equation 19 is the reduced-order equation for time-reversal extrapolation.

2.2 Continuous Online Time-Reversal Extrapolation

With the previously derived reduced-order system, the processor(s) are configured to implement continuous online time-reversal extrapolation. In this step, since the total discrete simulation time in the offline training step is $N_T$, which is likely substantially less than the total sampling number of recordings $N_D$, a discrete temporal window of length $N_T$ is used to select the reduced-order recording segments for extrapolation, using equation 11 and 19.

Then similar to equation 8, an equation $$U^{tr} = Qa^{tr} \qquad (20)$$

is used to reconstruct the complete time-reversed wavefields, where the structure of the basis Q is $$Q = \begin{pmatrix} Q_{v_x} \\ Q_{v_z} \\ Q_{\tau_{xx}} \\ Q_{\tau_{zz}} \\ Q_{\tau_{xz}} \end{pmatrix}. \qquad (21)$$

However, sometimes it is only necessary to reconstruct the wavefields within a target area, which means only the portion of the basis corresponding to the area is used in wavefield reconstruction, leading to $$u^{tr} = Q_{new} a^{tr}, \qquad (22)$$

where $Q_{new}$ represents the portion of basis Q we used for reconstruction.

This describes the procedure of reduced-order extrapolation for a single segment of data, whereas for continuous extrapolation, a parameter $N_{T_{step}}$ is used to move the temporal window of time-reversed data $D^{tr}$ to the next segment, followed by the same extrapolation process.

During back-propagation, a source focusing criterion is needed due to the absence of the zero-lag cross-correlation imaging condition which is normally applied in time-reverse extrapolation based source localization methods (Artman et al, 2010). An energy flux based focusing criterion can be applied to each time slice of the back-propagated source image to automatically determine the source location based on the Hough transform. Full details can be found in Li and Van der Baan (2016).

3 Example Embodiments

In some embodiments, the reduced-order system can be applied to two example applications, namely wavefield extrapolation and continuous microseismic event localization. Both examples use the Marmousi velocity model (FIG. 3), which is based on a profile through the North Quenguela trough in the Cuanza basin (Mora, 2002). The model is 2928 m in depth and 9216 m in length. The discrete velocity model we used in this section has grid numbers of 122 in depth and 384 in length, with a grid spacing of 24 m and time interval of 1.8 ms. The size of the finite differential operator (L in equation 11) for the high-fidelity simulation is [233229, 233229], where 233229 is the number of rows of u in equation 13.

In both examples, the high-fidelity simulations are conducted by solving the traditional two-way wave equations using a staggered-grid finite difference method, in which a fourth-order spatial and a second-order temporal finite difference operator are applied.

3.3 Reduced-Order Wavefield Extrapolation

This example embodiment is used to illustrate that input source time functions used for the on-line simulation can be different from the one used for off-line training step. For simplicity, in an illustrated example, only one source is used and is denoted by the second star from the top in image (a) of FIG. 3 and the smoothed Marmousi velocity model (image (b) of FIG. 3).

Figure 4:
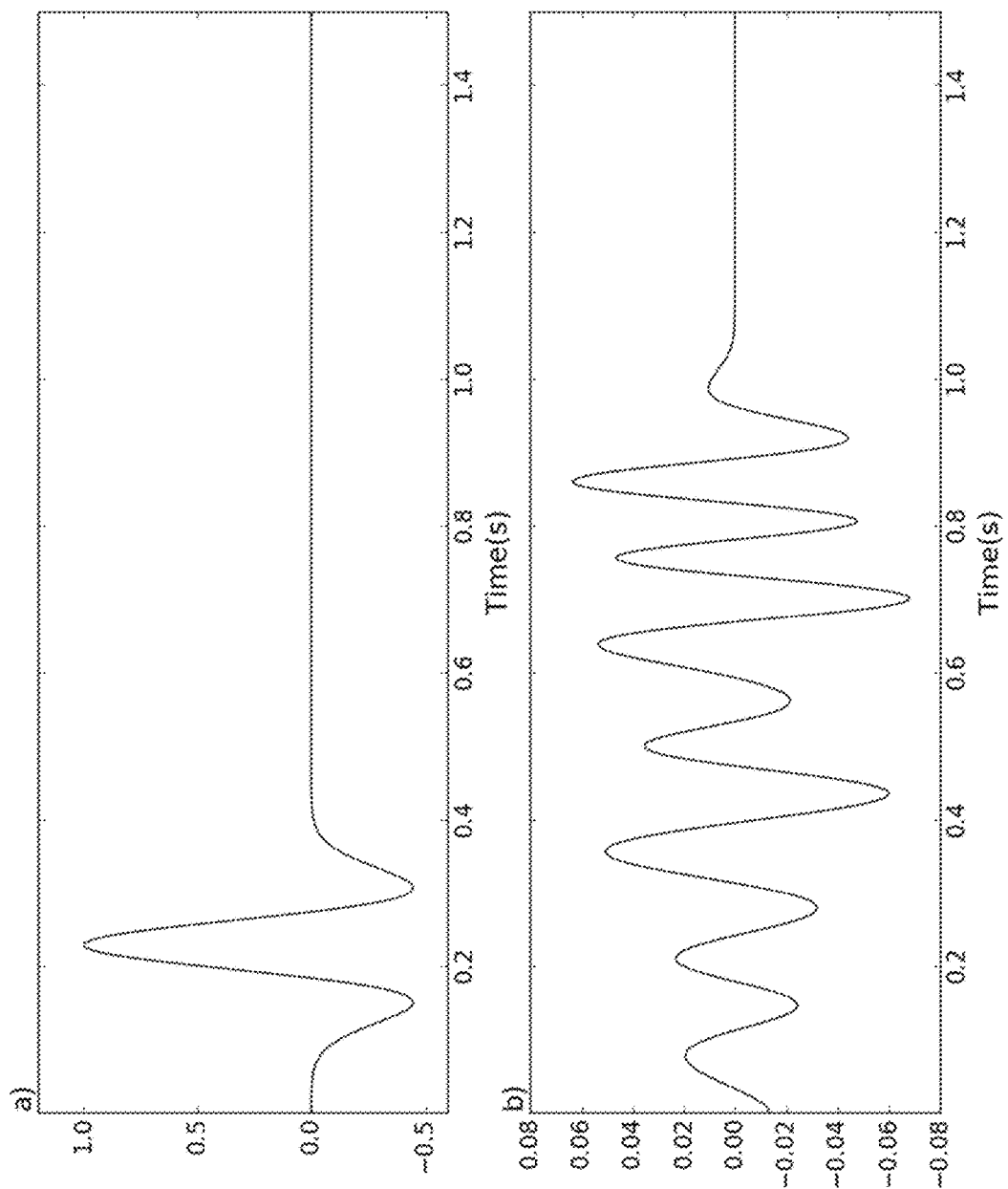
FIG. 4 shows source time functions a) used for off-line training, and b) used for on-line simulation.

In the off-line training step, an explosive source with a Ricker wavelet with a peak frequency of 10 Hz is used, which originates at 0.01 s (FIG. 4, graph (a)). The source locates on the right of the well with coordinates (x, z) of (1900, 5500). The total simulation time is 1.5 s, with a temporal interval of 1.8 ms. We save every snapshot of both particle velocity and stress wavefields obtained from the high-fidelity simulation to a snapshot matrix A according to equation 13 and 15. The size of A is [233229, 834], where 834 is the total number of discrete times $N_t$.

Figure 5:
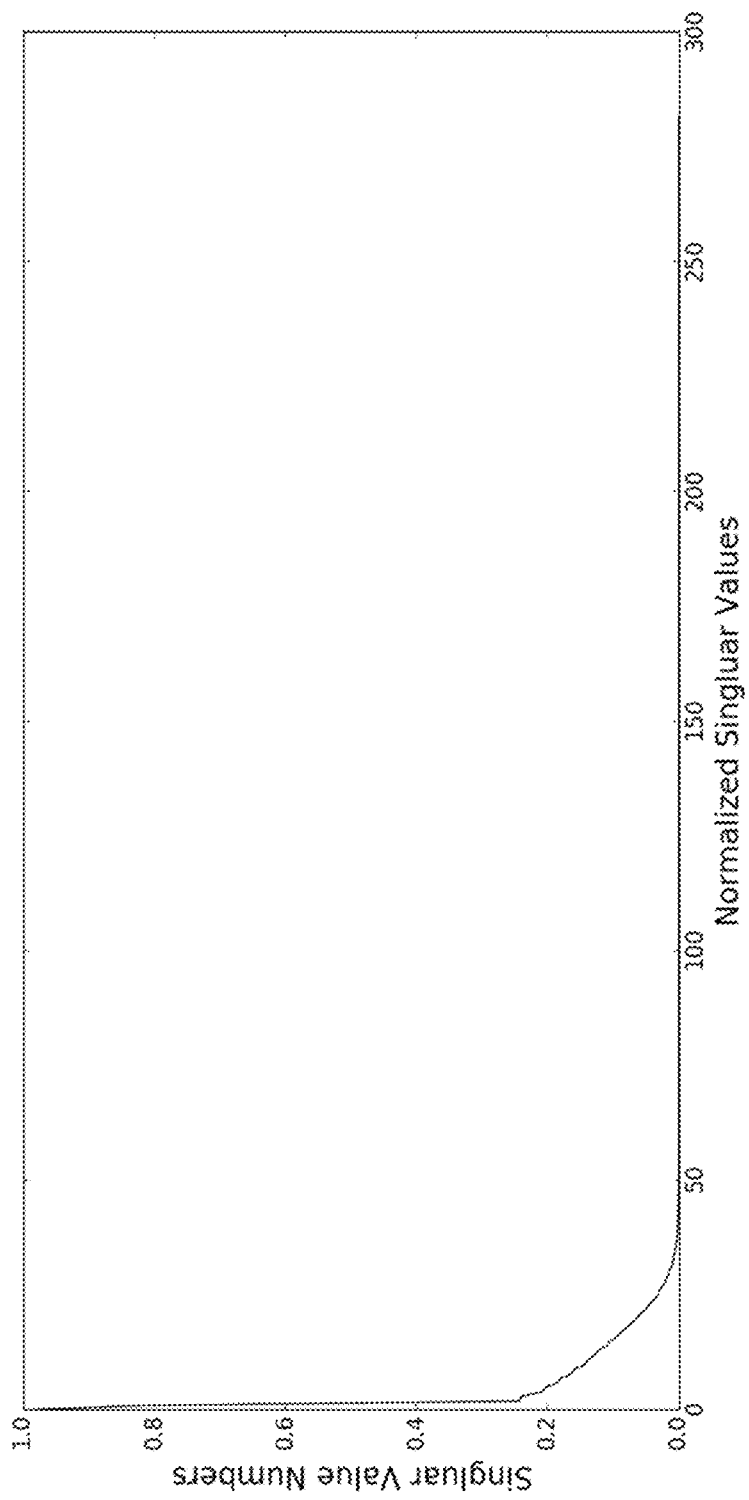
FIG. 5 shows a singular value plot of an example snapshot matrix A.

In order to illustrate the information redundancy of matrix A, we display the singular values of A in FIG. 5, obtained by applying SVD to A. FIG. 5 shows a sharp drop in the singular values, showing information redundancy exists in the traditional simulation process. We then apply ARQRd to automatically calculate basis Q of the snapshot matrix A, where the value of $\varepsilon$ is $10^{-6}$. The size of the basis Q is [233229, 216]. The reduced-order extrapolation system is constructed according to equation 10, in which the size of the reduced-order partial differential operator is [216, 216]. The size of the new system is about $2 \times 10^{-5}$ times of that of the original extrapolation system.

In the online simulation step, a new source time function (FIG. 4, graph (b)) is applied as force f(t) in equation 10, using the reduced-order matrix Q as obtained from the simpler source, as shown in FIG. 4, graph(a). Wavefields are calculated using equations 8 and 10. As a comparison, also calculated are the wavefields from the new source time function (FIG. 4, graph (b)) using the high-fidelity simulation. The resulting wavefields from the two simulation systems are shown in FIG. 6.

Figure 6:
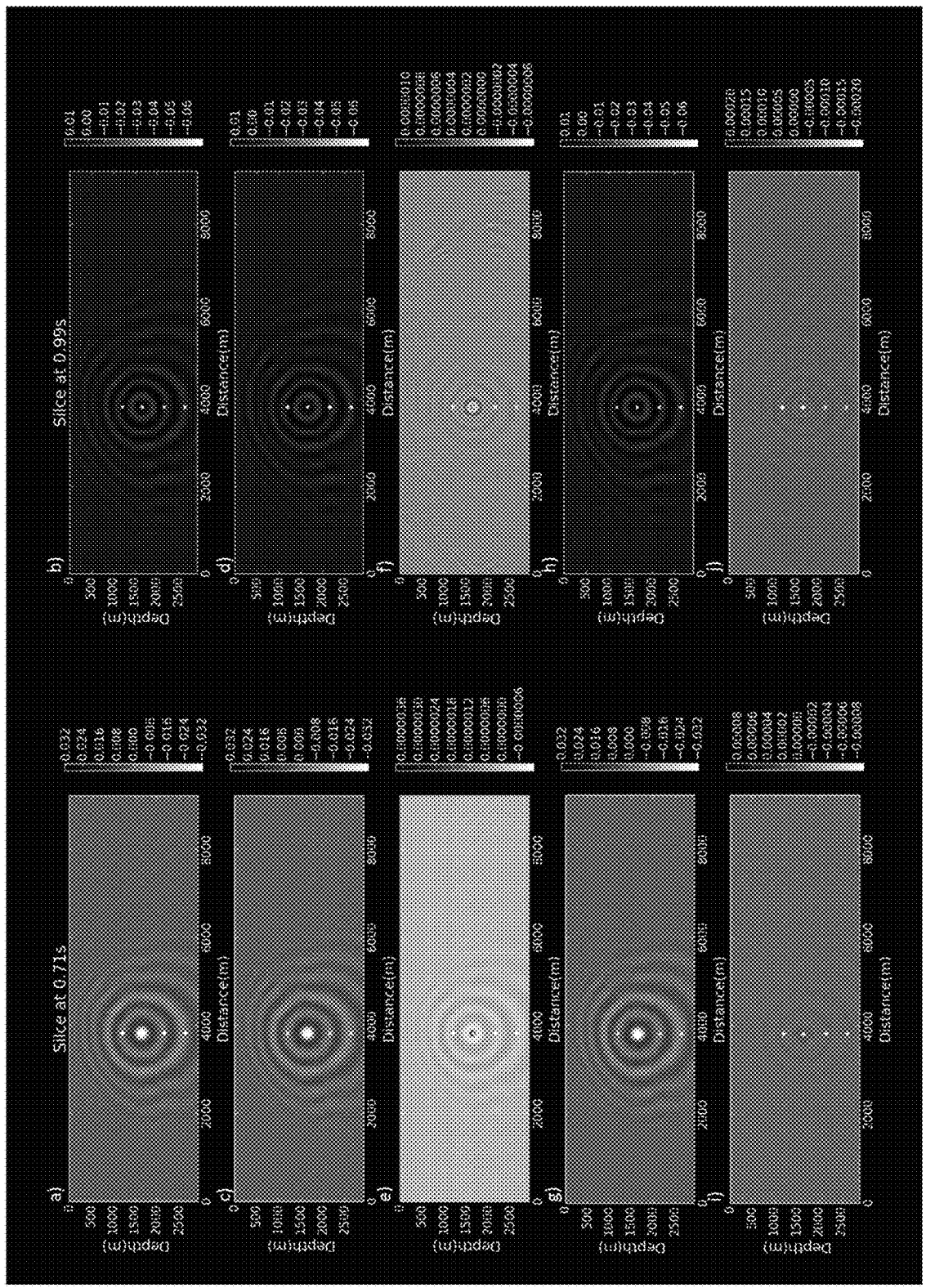
FIG. 6 shows visual representations of wavefield data.
Figure 7:
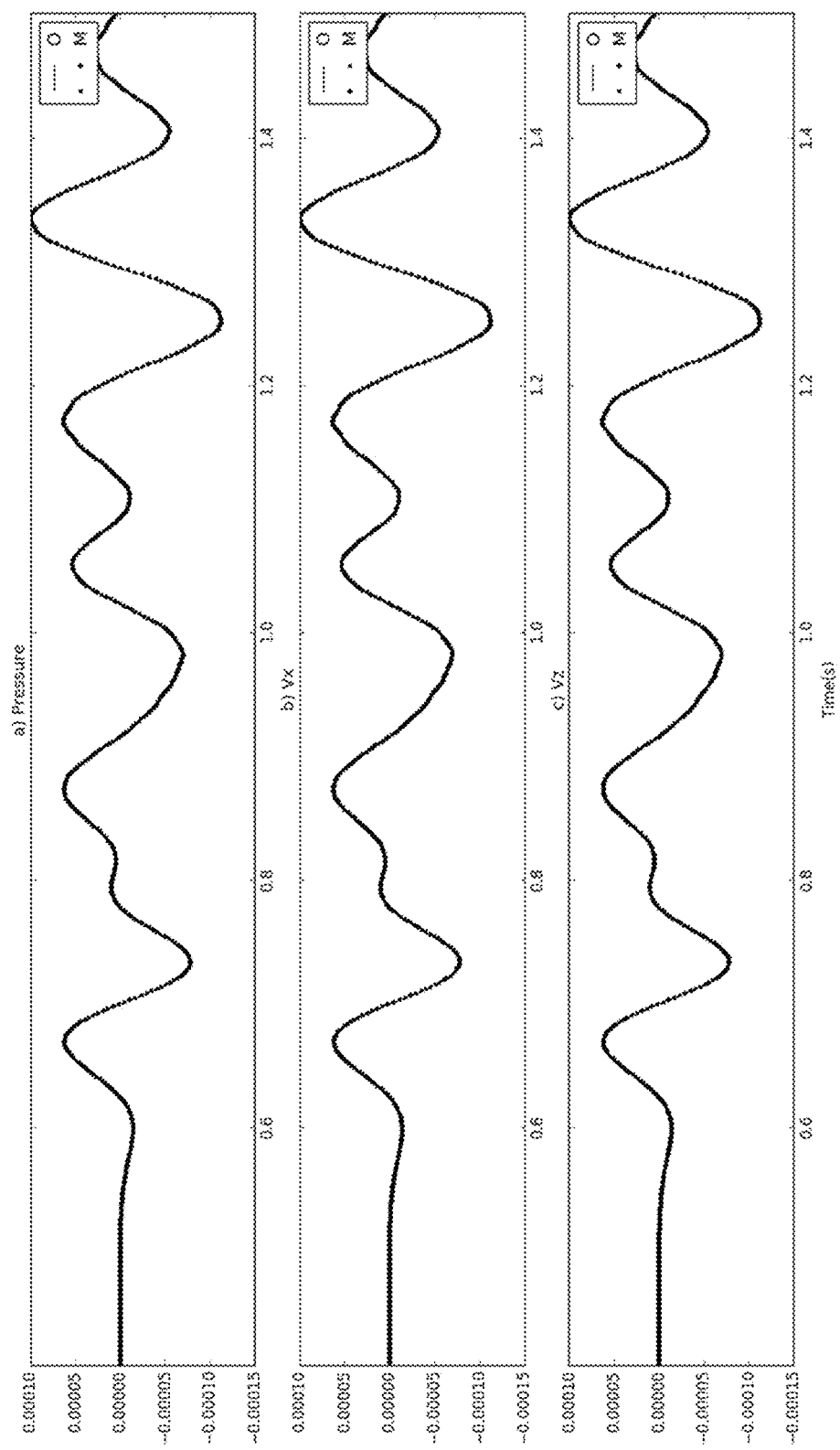
FIG. 7 shows a comparison of waveforms calculated by reduced-order and high-fidelity simulations.

The pressure wavefields in FIG. 6 at 0.71 s and 0.99 s are calculated using the reduced-order (FIG. 6, wavefields (a) and (b)) and the high-fidelity simulations (FIG. 6, wavefields (c) and (d)). FIG. 6, wavefields (e) and (f) show that the average differences between the pressure wavefields constructed by the two simulation schemes deviate less than 0.1% of the largest negative amplitudes. FIG. 6 shows a trace extracted from an arbitrary spatial location to compare the simulated waveforms in detail. The waveforms of pressure and x- and z-component of particle velocities from two simulation schemes overlap each other perfectly. The above results show that the reduced-order simulation is insensitive to changing source time functions in the on-line simulation step as long as the frequency contents overlap and the source position remains fixed. Wavefields derived from the reduced-order simulation are near-identical to the ones obtained from the high-fidelity simulation.

Next, compared are the computational costs of 1.5 s of both high-fidelity and reduced-order simulations, where the latter includes the costs of the offline training, online calculation of coefficients and wavefield construction, displayed in Table 1. For a fair comparison, the complete wavefields are calculated including two-component particle velocities and normal and shear stresses in both cases. The total computation time for the reduced-order simulation is 575.73 s, which is much longer than the cost of the high-fidelity simulation, 190 s. However, approximately 99% of computation costs are due to offline training in order to obtain an order-reduced simulation system whereas the calculation cost of coefficients only takes 0.04 of the total computational cost. These results indicate suitability of time-reversal extrapolation for continuous passive seismic event localization, since the system/process is only needed to do the offline training once using a limited total simulation duration whose computational cost is fixed and then it can be used repeatedly to extrapolate various recordings with extremely fast speed, which eventually takes less computational time than high-fidelity simulations for longer recording time.

Also the offline training can further be sped up by reducing the number of time snapshots in matrix A, equation 2 and 3 at the expense of less accurate reconstructions. For instance by including only one out of every three consecutive snapshots in time we obtain a much smaller snapshot matrix A. The offline training time becomes 480 s instead of 575.73 s and the maximum reconstruction errors are less than 2% (FIGS. ??i and ??j) for the same test setup. This is permissible as long as the down-sampled snapshots matrix still actually reflects the frequency content of the complete data.

TABLE 1

| Computation costs of 1.5 s high-fidelity and reduced-order simulations | |
|---|---|
| High fidelity | Total cost 190 s |
| Reduced order | Offline training 574 s |
| | Online calculation of coefficients 0.03 s |
| | Wavefield construction 1.7 s |

3.4 Continuous Microseismic Event Localization

Figure 3:
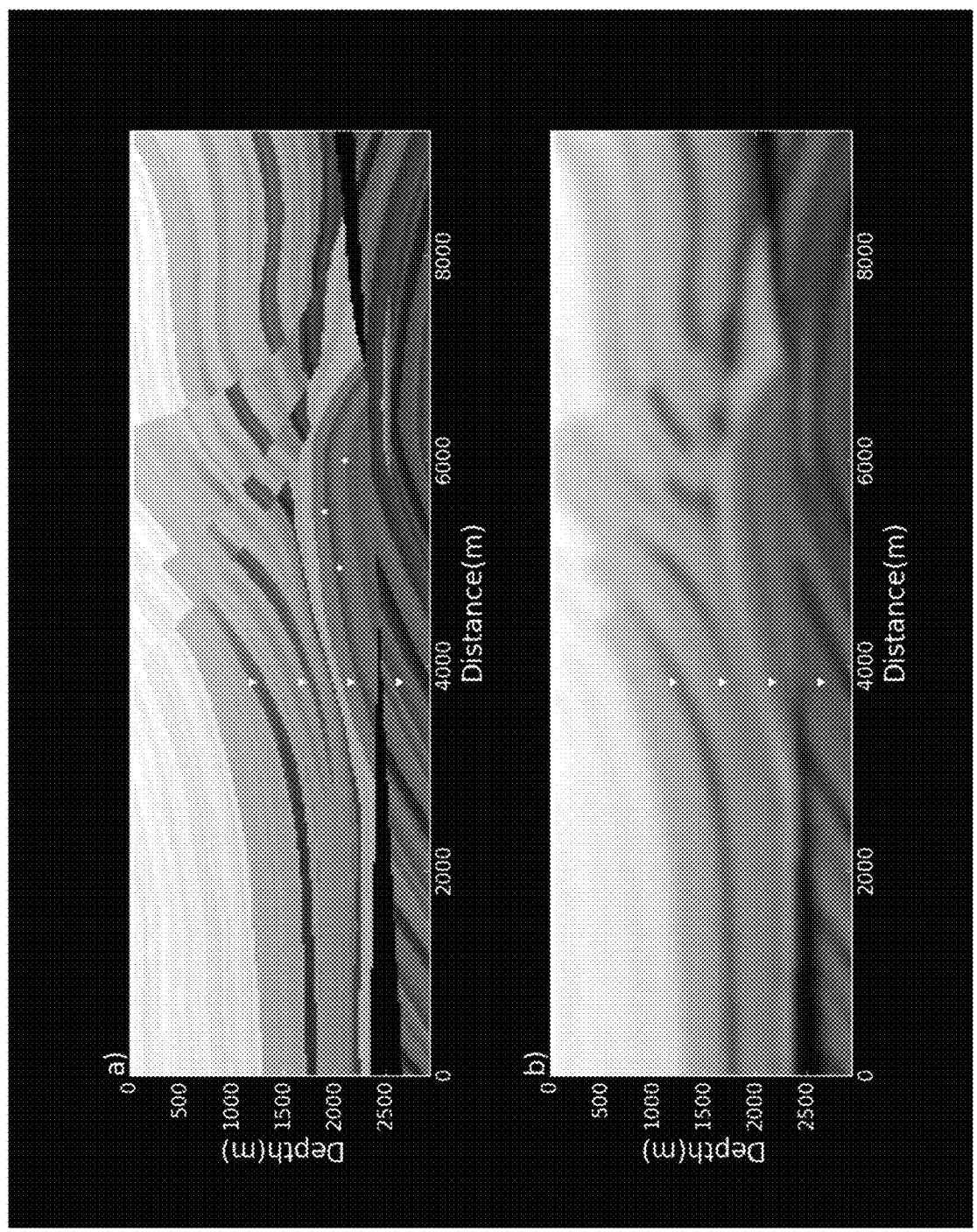
FIG. 3 shows example Marmousi velocity models. (a) shows a Marmousi velocity model for microseismic monitoring simulation where the stars represent miscroseismic events; (b) shows a Smoother Marmousi velocity model for time-reversal extrapolation. The triangles represent receivers in a borehole.

A microseismic monitoring setup in this example is simulated, as shown in FIG. 3, image (a). In the model, a vertical borehole is simulated with four receivers at depths approximately from 1000 m to 2900 m to record acoustic emissions from three double-couple sources. Particle velocities in the x and z direction are measured at each receiver, with a total recording time of 9 s (FIG. 8).

FIG. 3, image (b) shows a smoothed Marmousi velocity model used for off-line training and wavefield extrapolation. The model has the same discrete size as the non-smoothed model. The smoothed velocity model is used to mimic the usual case in which a true velocity model is often not available and also to prevent secondary reflections.

Since x and z-component recordings of four receivers are to be extrapolated, eight sources corresponding to each component of the four receivers are used for simulations in off-line training step. They are all single force source, four in the x direction and four in the z direction and all have a simulation time of 2 s. Ricker wavelets with peak frequencies of 10 Hz are used in offline training. The wavefields corresponding to the eight sources are calculated separately. To reduce memory issues in the ARQRd procedure, we only save every other snapshot in time obtained from each simulation to A using the ordering shown in equation 15. After applying ARQRd to matrix A, a basis Q is obtained including all information of the wavefields radiated from the eight sources. The size of basis Q is [233229, 779]. The size of the new system is about $10^{-5}$ times of that of the original extrapolation system, whereas if only counting the non-zero elements of equation 1, the size of the new system becomes 0.4 times that of the original extrapolation system.

Figure 8:
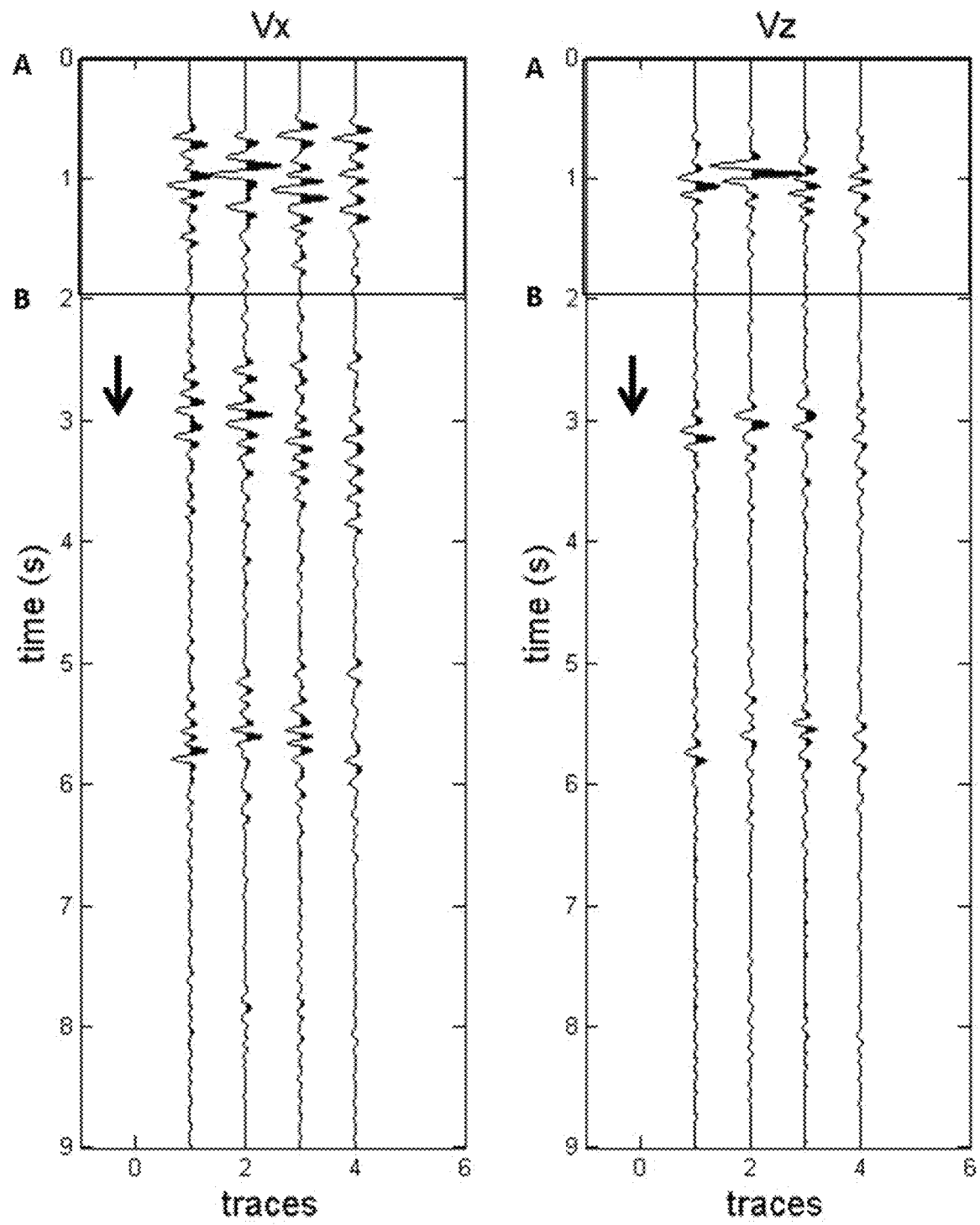
FIG. 8 shows particle velocities in the x direction (left panel) and z direction (right panel).
Figure 9:
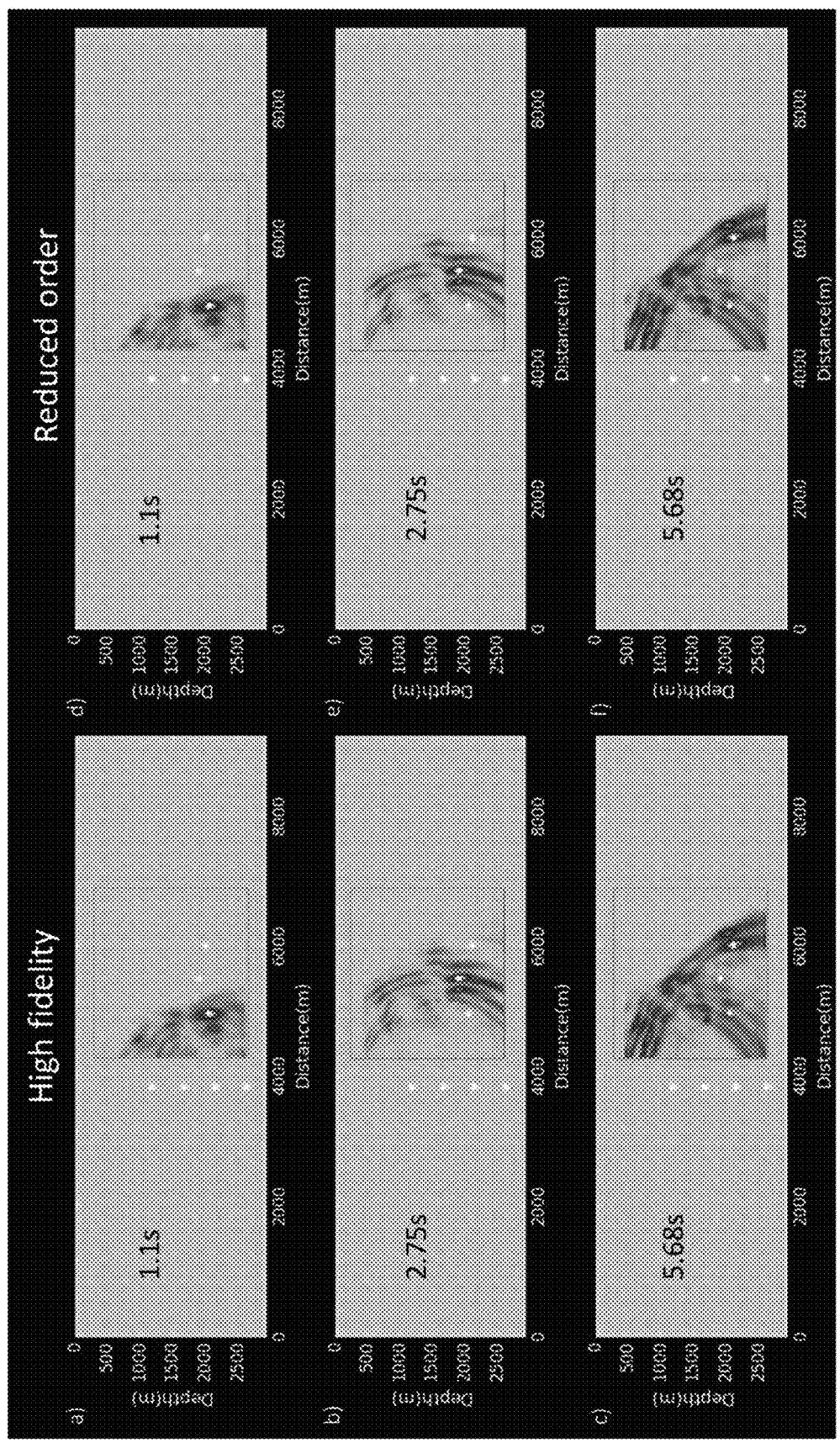
FIG. 9 shows energy flux maps using high-fidelity reconstructions, and reduced-order systems.

In the on-line extrapolation step, data are first segmented with a 2 s temporal window $N_T$, denoted by AB in FIG. 8. The window is sliding along the time axis in the direction of the black arrow in FIG. 8, with a sliding step $N_{T_{step}}$ of 0.5 s. 0.5 s was chosen simply to balance the number of events detected and total online extrapolation cost as for simplicity it was assumed there can be at most a single microseismic event in each data segment. So with the time window sliding along the recordings, the 9 s data are divided into fourteen segments. Each segment is injected into the reduced system respectively to calculate coefficients a. Full wavefields are reconstructed using equation 8. Only wavefields within a predefined area denoted by the red boxes in FIG. 9 were reconstructed, assuming that microseismic events solely occur here. All maps in FIG. 9 are absolute energy flux maps using the focusing criterion described in Li and Van der Baan (2017), for a better illustration.

Table 2 shows a comparison of the computation times in three scenarios, namely 1) direct back-propagation of 9 s recordings continuously using high-fidelity simulation system; 2) direct back-propagation of fourteen 2 s segments of recordings using high-fidelity simulation system; 3) offline training and back-propagation of fourteen 2 s segments of recordings using reduced-order system. It can be sees that reduced-order system based time-reversal extrapolation of 9 s recordings takes more total computational time than direct extrapolation using high-fidelity simulation system. But the computational costs of calculation of coefficients and reconstruction increase much slower than that when using high-fidelity system. In some embodiments, one may expect a much less computational cost if much longer recordings are processed.

TABLE 2

| Computation costs of continuous high-fidelity and reduced-order simulations | | |
|---|---|---|
| Continuous 9 s recordings | High-fidelity | Total cost 1140 s |
| 14 overlapping 2 s segments (total 9 s) | High-fidelity | Total cost 3546 s |
| 14 overlapping 2 s segments (total 9 s) | Reduced order | Offline training 4146 s |
| | | Online calculation of coefficients 0.36 s |
| | | Wavefield construction 28 s |

FIG. 9, snapshots a, b and c display the three snapshots of normalized energy flux maps using the high-fidelity reconstructions for the three focusing maxima whose coordinates (x, z) are (2042,4950) (1898,5506) and (2100,6007) in meters. The locations of the maxima on each snapshot are almost the same as the locations of the three predefined sources (blue star in FIG. 9), whose coordinates (x, z) are (2040,4960) (1900,5500) and (2100,6000) in meters. Those side lobes on the maps are due to the very limited number of receivers. The corresponding time of these three snapshots are 1.1 s, 2.75 s and 5.68 s, which are close to the true origin times of 1.1 s, 2.8 s and 5.6 s. The high-fidelity reconstructions are compared with the ones obtained using the reduced-order systems (FIGS. 9d, e and f) and find that the two results are essentially identical. This indicates that it is possible to do continuous microseismic monitoring using the reduced-order system real-time and obtain similar results as for the high-fidelity system but with substantially reduced online computation times.

In some instances, the devices/systems and methods using proper orthogonal decomposition can be effective tools for creating a substantially reduced simulation system by removing redundant information which normally exists in traditional two-way wave equation based simulations. The reduced simulation system is significantly faster with good reconstruction quality. However, this may come at the cost of a computationally intensive offline training step, which could be even more expensive than direct high-fidelity simulations. Generally, the cost of offline training is determined by the calculations of snapshot matrix A and its left orthonormal basis Q, where the size of A is directly determined by the numbers of both high-fidelity simulations corresponding to the included different sources and time slices selected from each simulation for training. A snapshot matrix A is called a complete snapshot matrix when it includes high-fidelity simulations with sources at every grid point within the model. Yet this may not be required for all applications. For instance, a sufficient snapshot matrix for time-reversal extrapolation only includes those simulations with source locations corresponding to receiver locations in the real world, which is a small portion of a complete snapshot matrix A. Conversely for fast forward modeling of waveforms due to sources at any possible position (Pereyra and Kaelin, 2008), a near-complete snapshot matrix is required. Whether it is necessary to apply the proposed method to a certain application depends on the online versus offline computation times as well as the computational resources available in the online stage.

Figure 10:
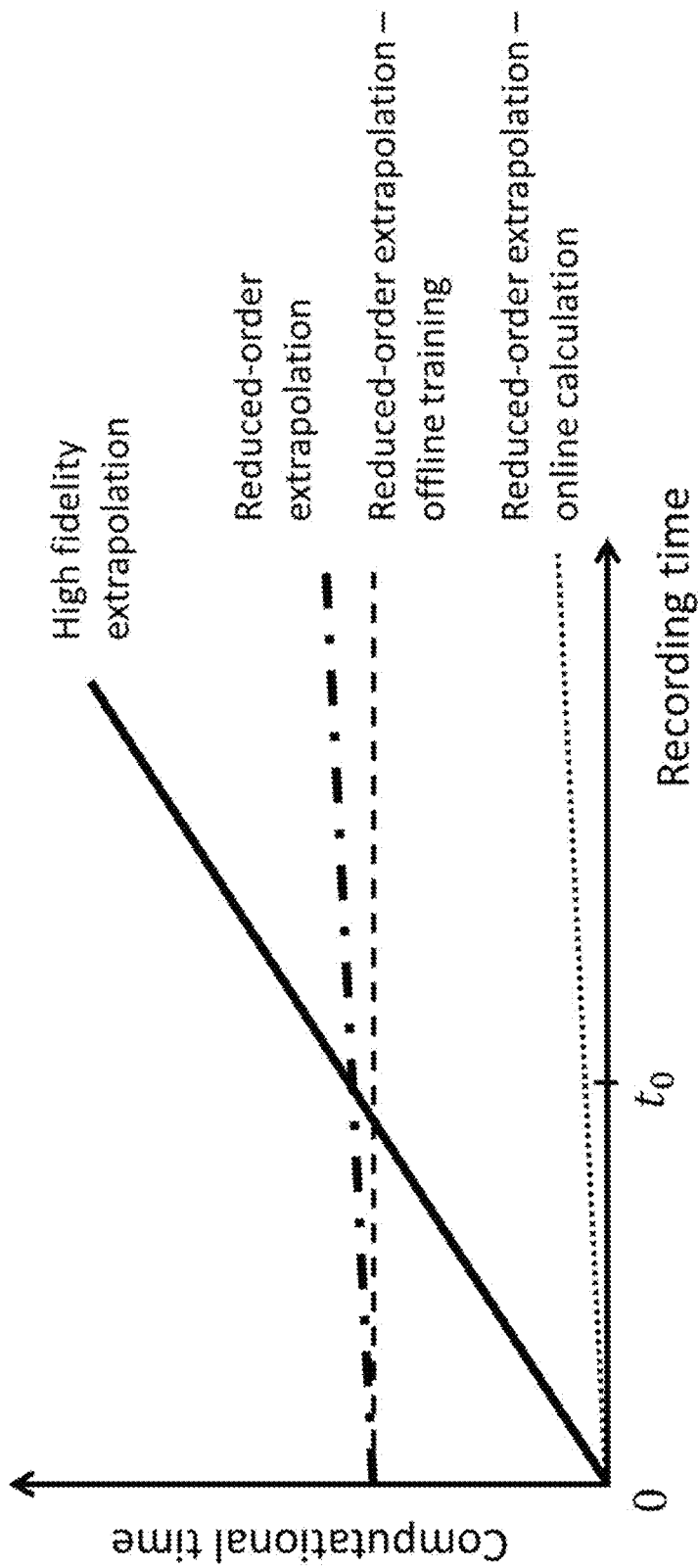
FIG. 10 is a chart illustrating computation versus recording time.

Two characteristics of microseismic monitoring permit and encourage the creation of a reduced-order time-reversal extrapolation for real-time microseismic event localization, namely a limited number of receivers and long monitoring/recording time (usually from several hours to days). Borehole acquisitions typically use up to a dozen geophones, whereas surface acquisitions can be substantially larger ((Duncan and Eisner, 2010; van der Baan et al, 2013). Yet it is not required to simulate a source at every possible spatial position in depth, greatly reducing the number of simulations which eventually leads to a more interesting snapshot matrix A. Combined with the long recording times, this ensures that the overall computational time of reduced-order time-reversal extrapolation, including both offline and online calculation, is much smaller than the time required when using a high-fidelity simulation system. FIG. 10 shows a qualitative sketch of computation versus recording time. The starting computation time of reduced-order extrapolation (dash-dot line) is not zero because of offline training (dashed line) which could be more than direct high-fidelity extrapolation (solid line). The added computation time per reduced-order simulation is substantially smaller than that for the high-fidelity ones. Hence at some recording length the two approaches use the same total computation times and reduced-order extrapolation uses less computation time if recording time further increases.

To obtain both good performance and reasonable computation time, several issues need to be addressed during the implementation of the proposed method for continuous time-reversal extrapolation. First, it is normally not necessary to include every time slice obtained from high fidelity simulations in snapshot matrix A as long as the time interval between selected two adjacent time slices satisfies Nyquist sampling theorem. Second, the computation of the left orthonormal basis Q is controlled by the positive error tolerance $\varepsilon$. With a lower error tolerance $\varepsilon$, the left orthonormal basis Q creates a more accurate but larger reduced-order system since it captures more information in snapshot matrix A, whereas conversely, a higher error tolerance leads to a less accurate but smaller reduced-order system. Finally, real data should be divided into segments where the total time of each segment for online extrapolation is not longer than the simulation time $T_H$ for offline training. Because no wavefield information at time over $T_H$ is included neither in snapshot matrix A nor in the reduced-order system, the computation of coefficient vector a(t) becomes unstable when extrapolation time is longer than $T_H$.

Traditional simulation/extrapolation based on the two-wave wave equation is a high-fidelity but time-consuming process which has substantial information redundancy because discrete wavefields are similar within adjacent spatial grids and temporal slices. It also repeatedly solves the same simulation problem since only the recorded data change but the velocity field remains constant. In some embodiments, systems, devices and methods described by way of example herein using proper orthogonal decomposition can provide a technique to turn the high-fidelity simulation into a much smaller system by removing the redundancy, which can be used to build a fast time-reversal extrapolation scheme. In some instances, this may permit real-time waveform-based microseismic event localization using feasible computational resources in the field.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

REFERENCES

Artman, B., I. Podladtchikov and B. Witten, 2010, Source Location using time-reverse imaging: Geophysical Prospecting, 58, 861-873.

Benner, P., S. Gugercin and K. Willcox, 2015, A Survey of Projection-Based Model Reduction Methods for Parametric Dynamical Systems: SIAM Review, 57(4), 483-531.

Castellanos, F. and M. Van der Baan, 2013, Microseismic event locations using the double-difference algorithm: CSEG Recorder, 38(3), 26-37

Castellanos, F. and M. Van der Baan, 2015, Waveform similarity for quality control of event locations, time picking and moment tensor solutions: Geophysics, 80(6), WC99-WC106

Chatterjee, A., 2000, An introduction to the proper orthogonal decomposition: Current Science, Special Section: Computer Science, 78(7), 808-817.

Cheng, J. and M. Sacchi, 2015, A fast rank-reduction algorithm for 3D deblending via randomized QR decomposition: 85th Annual International Meeting, SEG, Expanded Abstracts, 3830-3835.

Duncan P. M. and L. Eisner, 2010, Reservoir characterization using surface microseismic monitoring: Geophysics, 75, no. 5, 75A139-75A146.

Fehler, M., 2008, Earthquake localization in Handbook of Signal Processing in Acoustics: Springer New York, 1627-1634.

Gao, J., M. Sacchi, and X. Chen, 2011, A fast rank reduction method for the reconstruction of 5D seismic volumes: 81st Annual International Meeting, SEG, Expanded Abstracts, 3622秋 ?627.

Halko, N., P. Martinsson, J. A. Tropp, 2010, Finding structure with randomness: Probabilistic algorithms for constructing approximate matrix decomposition: SIAM Review, Survey and Review section, 53(2), 217-288.

Lassila, T., A. Manzoni, A. Quarteroni and G. Rozza, 2013, A reduced computational and geometrical framework for inverse problems in hemodynamics: International Journal for Numerical Methods in Biomedical Engineering, 29, 741-776.

Li, Z. H. and M. van der Baan, 2016, Microseismic event localization by acoustic time reversal extrapolation: Geophysics, 81, no. 3, KS123-KS134.

Li, Z. H. and M. van der Baan, 2017, Elastic passive source localization using rotational motion: Geophysical Journal International, in revision.

Lieu, T., C. Farhat and M. Lesoinne, 2006, Reduced-order fluid/structure modeling of a complete aircraft configuration: Computer Methods in Applied Mechanics and Engineering, 195, 5730-5742.

Lucia, D. J., P. S. Beran and W. A. Silva, 2004, Reduced-order modelling: new approaches for computational physics: Progress in Aerospace Sciences, 40(1-2), 51-117.

McMechan, G. A., 1983, Migration by extrapolation of time-dependent boundary values: Geophysical Prospecting, 31, 413-420.

McMechan, G. A., J. H. Luetgert and W. D. Mooney, 1985, Imaging of earthquake sources in Long Valley Valdera, Calif., 1983: Bulletin of the Seismological Society of America, 75, 1005-1020.

Mora, C. B., 2002, Marmousi synthetic dataset: Stanford Exploration Project, Report DATALIB, 1-10.

Oropeza, V., and M. D. Sacchi, 2011, Simultaneous seismic data denoising and reconstruction via multichannel singular spectrum analysis: Geophysics, 76, no. 3, V25-V32.

Pereyra, V. and B. Kaelin, 2008, Fast wave propagation by model order reduction: Electronic Transactions on Numerical Analysis, vol. 30.

Sartori, A., D. Baroli, A. Cammi, L. Luzzi and G. Rozza, 2014, A reduced order model for multi-group time-dependent parametrized reactor spatial kinetics, in Proceedings of the 2014 $22^{nd}$ International COnference on Nuclear Engineering (ICONE22), Prague, Czech Republic, ASME, 2014, paper 30707.

Schilders, W., 2008, Introduction to Model Order Reduction in Model Order Reduction: Theory, Research Aspects and Applications: Volume 13 of the series Mathematics in Industry, 3-32.

Strang, G., 2006, Linear algebra and its applications, Fourth Edition: Cengage Learning.

van der Baan, M., D. Eaton and M. Dusseault, 2013, Microseismic monitoring developments in hydraulic fracture stimulation. in Bunger A. P., J. McLennan and R. Jeffrey, eds., Effective and sustainable hydraulic fracturing, Intech, 439-466.

Wu, C. L., D. Bevc and V. Pereyra, 2013, Model order reduction for efficient seismic modelling: SEG Houston Annual Meeting, extended abstract.

Zeng, Y. Q. and Q. H. Liu, 2001, A staggered-grid finite-difference method with perfectly matched layers for poroelastic wave equations: the Journal of the Acoustic Society of America, 109(6), 2571-2580.

What is claimed is:

1. A computer-implemented method for seismic event localization, the method comprising:
   generating, with at least one processor, a vectorized snapshot matrix representing wave propagation data at a series of snapshots in time for a subterranean formation;
   computing a reduced orthonormal column basis matrix based on the vectorized snapshot matrix;
   constructing a reduced order wave propagation model based on the reduced orthonormal column basis matrix;
   receiving seismic data collected from a plurality of receivers at the subterranean formation;
   generating a time-domain coefficient matrix based on back propagation of the received seismic data and the reduced order wave propagation model;
   reconstructing time-reversed wavefield data based on the time-domain coefficient vector; and
   generating signals for outputting wavefield or seismic event location information based on the time-reversed wavefield data.

2. The method of claim 1, wherein computing the reduced orthonormal column basis matrix comprises: singular value decomposition or QR decomposition.

3. The method of claim 1, wherein computing the reduced orthonormal column basis matrix is based on multi-dimensional stress-velocity two-way elastic wave equations:

$$\frac{\partial v_x(t)}{\partial t} = \frac{1}{\rho}\frac{\partial \tau_{xx}(t)}{\partial x} + \frac{1}{\rho}\frac{\partial \tau_{xz}(t)}{\partial z} + f_{v_x}(t)$$

$$\frac{\partial v_z(t)}{\partial t} = \frac{1}{\rho}\frac{\partial \tau_{xz}(t)}{\partial x} + \frac{1}{\rho}\frac{\partial \tau_{zz}(t)}{\partial z} + f_{v_z}(t)$$

$$\frac{\partial \tau_{xx}(t)}{\partial t} = (\lambda + 2\mu)\frac{\partial v_x(t)}{\partial x} + \lambda\frac{\partial v_z(t)}{\partial z} + f_P(t)$$

$$\frac{\partial \tau_{zz}(t)}{\partial t} = (\lambda + 2\mu)\frac{\partial v_z(t)}{\partial z} + \lambda\frac{\partial v_x(t)}{\partial x} + f_P(t)$$

$$\frac{\partial \tau_{xz}(t)}{\partial t} = \mu\left(\frac{\partial v_x(t)}{\partial z} + \frac{\partial v_z(t)}{\partial x}\right),$$

where $\tau_{xx}$ and $t_{zz}$ are the x and z components of the normal stress fields; $\tau_{xz}$ is shear stress field; $v_x$ and $v_z$ are horizontal and vertical components of particle velocity fields; $f_{v_x}$ and $f_{v_z}$ are single forces and $f_p$ is an external pressure source; $\mu$ and $\lambda$ are Lame parameters; $\rho$ is density; and t is time.

4. The method of claim 1, wherein generating the vectorized snapshot matrix comprises:
   simulating wave propagations on a set of spatially discretized partial differential equations; and
   extracting simulated wave propagation data at each snapshot in the series of snapshots in time.

5. The method of claim 4, wherein simulating the wave propagations uses source positions corresponding to locations of physical receivers at the subterranean formation.

6. The method of claim 4, wherein the set of spatially discretized partial differential equations include 2-dimensional stress-velocity two-way elastic wave equations.

7. The method of claim 1, wherein the wave propagation data is generated with a velocity model associated with the subterranean formation.

8. The method of claim 1, wherein the seismic data collected from the plurality of receivers includes pressure data or particle velocity data.

9. The method of claim 1, wherein reconstructing the time-reversed wavefield data is based on reconstructing a target area of the subterranean formation.

10. The method of claim 1, wherein the vectorized snapshot matrix comprises wave propagation data and absorbing layer values.

11. A computing system for seismic event localization, the system comprising:
at least one memory and at least one processor configured for:
generating a vectorized snapshot matrix representing wave propagation data at a series of snapshots in time for a subterranean formation;
computing a reduced orthonormal column basis matrix based on the vectorized snapshot matrix;
constructing a reduced order wave propagation model based on the reduced orthonormal column basis matrix;
receiving seismic data collected from a plurality of receivers at the subterranean formation;
generating a time-domain coefficient matrix based on back propagation of the received seismic data and the reduced order wave propagation model;
reconstructing time-reversed wavefield data based on the time-domain coefficient vector; and
generating signals for outputting wavefield or seismic event location information based on the time-reversed wavefield data.

12. The system of claim 11, wherein computing the reduced orthonormal column basis matrix comprises: singular value decomposition or QR decomposition.

13. The system of claim 11, wherein computing the reduced orthonormal column basis matrix is based on multi-dimensional stress-velocity two-way elastic wave equations:

$$\frac{\partial v_x(t)}{\partial t} = \frac{1}{\rho}\frac{\partial \tau_{xx}(t)}{\partial x} + \frac{1}{\rho}\frac{\partial \tau_{xz}(t)}{\partial z} + f_{v_x}(t)$$

$$\frac{\partial v_z(t)}{\partial t} = \frac{1}{\rho}\frac{\partial \tau_{xz}(t)}{\partial x} + \frac{1}{\rho}\frac{\partial \tau_{zz}(t)}{\partial z} + f_{v_z}(t)$$

$$\frac{\partial \tau_{xx}(t)}{\partial t} = (\lambda + 2\mu)\frac{\partial v_x(t)}{\partial x} + \lambda\frac{\partial v_z(t)}{\partial z} + f_p(t)$$

$$\frac{\partial \tau_{zz}(t)}{\partial t} = (\lambda + 2\mu)\frac{\partial v_z(t)}{\partial z} + \lambda\frac{\partial v_x(t)}{\partial x} + f_p(t)$$

$$\frac{\partial \tau_{xz}(t)}{\partial t} = \mu\left(\frac{\partial v_x(t)}{\partial z} + \frac{\partial v_z(t)}{\partial x}\right),$$

where $\tau_{xx}$ and $\tau_{zz}$ are the x and z components of the normal stress fields; $\tau_{xz}$ is shear stress field; $v_x$ and $v_z$ are horizontal and vertical components of particle velocity fields; $f_{v_x}$ and $f_{v_z}$ are single forces and $f_p$ is an external pressure source; $\mu$ and $\lambda$ are Lame parameters; $\rho$ is density; and t is time.

14. The system of claim 11, wherein generating the vectorized snapshot matrix comprises:
simulating wave propagations on a set of spatially discretized partial differential equations; and
extracting simulated wave propagation data at each snapshot in the series of snapshots in time.

15. The system of claim 14, wherein simulating the wave propagations uses source positions corresponding to locations of physical receivers at the subterranean formation.

16. The system of claim 14, wherein the set of spatially discretized partial differential equations include 2-dimensional stress-velocity two-way elastic wave equations.

17. The system of claim 11, wherein the wave propagation data is generated with a velocity model associated with the subterranean formation.

18. The system of claim 11, wherein the seismic data collected from the plurality of receivers includes pressure data or particle velocity data.

19. The system of claim 11, wherein reconstructing the time-reversed wavefield data is based on reconstructing a target area of the subterranean formation.

20. The system of claim 11, wherein the vectorized snapshot matrix comprises wave propagation data and absorbing layer values.

21. A non-transitory computer-readable medium or media having stored thereon computer-readable instructions which when executed by at least one processor, configure the at least one processor for:
generating a vectorized snapshot matrix representing wave propagation data at a series of snapshots in time for a subterranean formation;
computing a reduced orthonormal column basis matrix based on the vectorized snapshot matrix;
constructing a reduced order wave propagation model based on the reduced orthonormal column basis matrix;
receiving seismic data collected from a plurality of receivers at the subterranean formation;
generating a time-domain coefficient matrix based on back propagation of the received seismic data and the reduced order wave propagation model;
reconstructing time-reversed wavefield data based on the time-domain coefficient vector; and
generating signals for outputting wavefield or seismic event location information based on the time-reversed wavefield data.

* * * * *